United States Patent
Shigematsu et al.

(10) Patent No.: US 7,254,711 B2
(45) Date of Patent: Aug. 7, 2007

(54) NETWORK AUTHENTICATION SYSTEM, METHOD, AND PROGRAM, SERVICE PROVIDING APPARATUS, CERTIFICATE AUTHORITY, AND USER TERMINAL

(75) Inventors: Satoshi Shigematsu, Tokyo (JP); Mamoru Nakanishi, Tokyo (JP); Hiroki Suto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 878 days.

(21) Appl. No.: 10/117,727

(22) Filed: Apr. 4, 2002

(65) Prior Publication Data

US 2002/0152375 A1 Oct. 17, 2002

(30) Foreign Application Priority Data

Apr. 5, 2001 (JP) ............................. 2001-107173

(51) Int. Cl.
*H04L 9/32* (2006.01)
*G06K 9/00* (2006.01)

(52) U.S. Cl. ...................... 713/175; 713/156; 713/184; 713/186; 726/6; 726/10

(58) Field of Classification Search ...................... None
See application file for complete search history.

(56) References Cited

U.S. PATENT DOCUMENTS

| | | | |
|---|---|---|---|
| 5,280,527 A | | 1/1994 | Gullman et al. |
| 6,105,010 A * | | 8/2000 | Musgrave ..................... 705/44 |
| 6,202,151 B1 * | | 3/2001 | Musgrave et al. .......... 713/186 |
| 6,230,148 B1 * | | 5/2001 | Pare et al. ..................... 705/40 |
| 6,310,966 B1 * | | 10/2001 | Dulude et al. .............. 382/115 |
| 6,793,134 B2 * | | 9/2004 | Clark .......................... 235/379 |
| 6,798,334 B1 * | | 9/2004 | Meister et al. ............. 340/5.52 |
| 6,854,056 B1 * | | 2/2005 | Benantar et al. ............ 713/156 |
| 2001/0034836 A1 * | | 10/2001 | Matsumoto et al. ........ 713/176 |
| 2002/0095588 A1 * | | 7/2002 | Shigematsu et al. ........ 713/186 |
| 2003/0101349 A1 * | | 5/2003 | Wang .......................... 713/186 |
| 2005/0066180 A1 * | | 3/2005 | Watanabe ................... 713/186 |

FOREIGN PATENT DOCUMENTS

EP 0 986 209 3/2000

(Continued)

OTHER PUBLICATIONS

Jain et al, "Biometric Identification", Feb. 2000, Communications of the ACM, vol. 43, No. 2, p. 91-98.*
Marco Tartagni and Robert Guerrier, A 390dpi Live Fingerprint Imager Based on Feedback Capacitive Sensing Scheme, 1997 IEEE International Solid-State Circuits Conference, pp. 200-201 (1997).
P.Ray, P. Charvet, M.T. Delaye, and S. Abouhassan, "A High Density Capacitive Pressure Sensor Application", Proceedings of Transducers, 97, pp. 1453-1456 (1997).

*Primary Examiner*—Christopher Revak
(74) *Attorney, Agent, or Firm*—Blakely Sokoloff Taylor & Zafman

(57) ABSTRACT

A certificate authority for certifying the validity of the collation result from a user terminal is placed on a communication network. The user terminal identifies a user himself or herself by collation by using biometrical information of the user. In response to notification of the collation result from the user terminal across the communication network, a service providing apparatus requests across the communication network the certificate authority to certify the validity of the collation result. When a certificate which certifies the validity of the collation result is notified from the certificate authority across the communication network, the service providing apparatus provides a predetermined service to the user.

34 Claims, 13 Drawing Sheets

FOREIGN PATENT DOCUMENTS

| | | |
|---|---|---|
| EP | 1 081 662 | 3/2001 |
| JP | 1988 63-53099 | 7/1988 |
| JP | 1999 11-056617 | 2/1999 |
| JP | 2000-047990 | 2/2000 |

* cited by examiner

FIG.19A
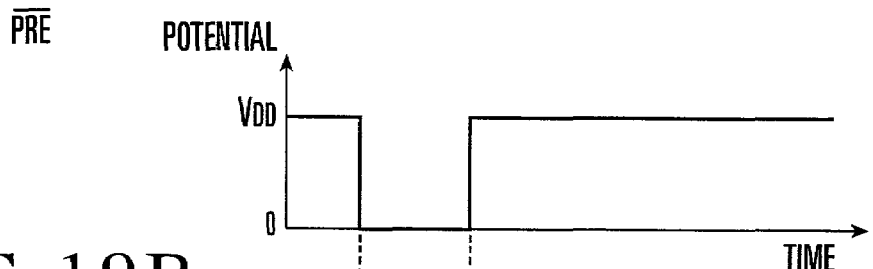
FIG.19B
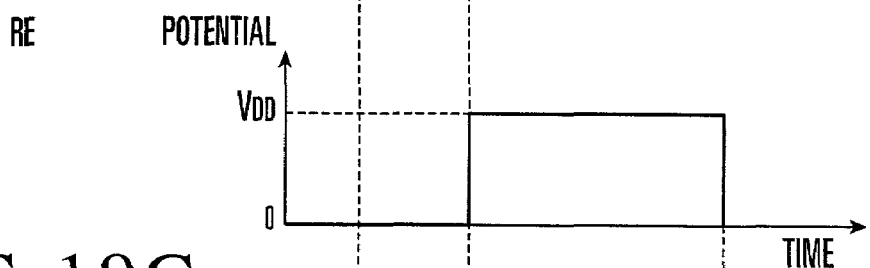
FIG.19C
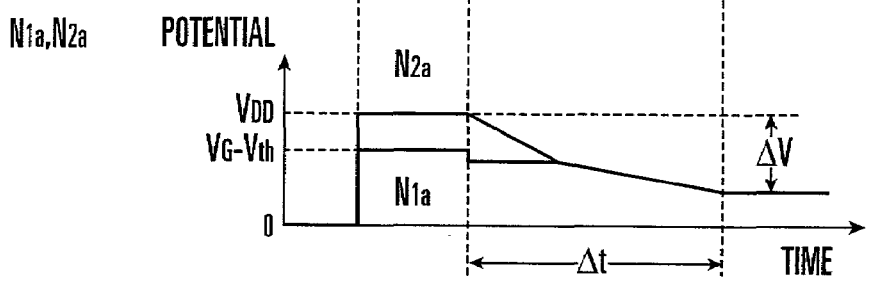
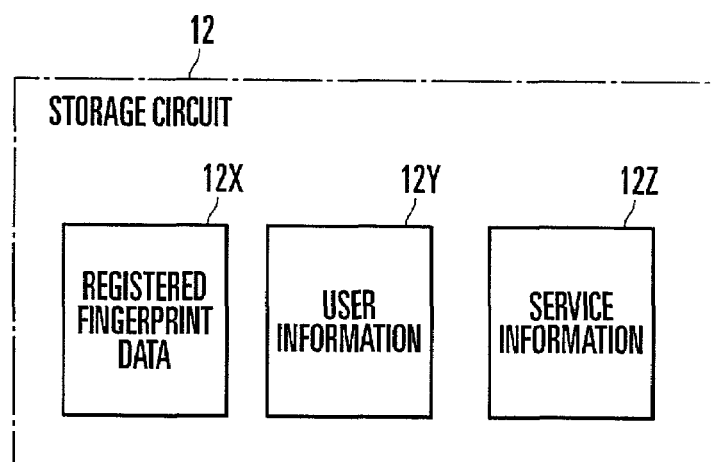
FIG.20

NETWORK AUTHENTICATION SYSTEM, METHOD, AND PROGRAM, SERVICE PROVIDING APPARATUS, CERTIFICATE AUTHORITY, AND USER TERMINAL

BACKGROUND OF THE INVENTION

The present invention relates to a network authentication system, method, and program, a service providing apparatus, a certificate authority, and a user terminal and, more particularly, to a network authentication system, method, and program, a service providing apparatus, a certificate authority, and a user terminal which perform authentication by using biometrical information of a user in providing a given service on a communication network.

In a highly information-oriented society, it is increasingly demanded to strictly authenticate a user while keeping affinity with information processing. This demand is particularly high in an information management system which handles important information such as personal information across a communication network, and in a settlement system which performs electronic payment on a communication network.

To meet this demand, researches on network authentication systems for authenticating a user via a communication network on the basis of electronically detected unique biometrical information are being extensively made on the basis of network communication technologies and information processing technologies.

In a conventional network authentication system, as shown in FIG. 14, a user terminal 7 to be accessed by a user detects biometrical information of the user, such as a fingerprint, and a collating unit 71 identifies this biometrical information by collation. A collation result 71A is transmitted as a collation result 7A from a communication apparatus 72 to a service providing apparatus 8 via a communication network 9. In the service providing apparatus 8, a processing unit 82 performs predetermined processing on the basis of a collation result 81A received by a communication unit 81, thereby providing a service.

In another system as shown in FIG. 15, an encryption circuit 74 of a user terminal 7 encrypts a collation result 71A from a collating unit 71 by using an encryption key 73A prestored in a storage circuit 73. The result of encryption is transmitted as communication data 7B. A decryption circuit 84 of a service providing apparatus 8 decrypts this communication data 7B from the user terminal 7 by using a decryption key 83A prestored in a database 83, thereby obtaining a collation result 84A.

Unfortunately, in the former conventional network authentication system (FIG. 14), the service providing-apparatus determines whether to provide a service on the basis of the collation result received directly from the user terminal. Therefore, the collation result can be easily tapped, and any third party can easily pose as the user. This lowers the safety.

In the latter system (FIG. 15), tapping and posing can be prevented because the collation result is encrypted. However, it is necessary to match encryption keys and decryption keys for use in user terminals and service providing apparatuses in one-to-one correspondence with each other. Accordingly, if a plurality of user terminals share one service providing apparatus 8, decryption keys corresponding to encryption keys of all these user terminals must be managed by the service providing apparatus.

To realize safe management of the keys in the service providing apparatus, therefore, the scale of the system increases.

Furthermore, if a plurality of service providing apparatuses are present and each user terminal selectively uses these service providing apparatuses as needed, each user must register a decryption key corresponding to an encryption key of his or her user terminal into all the service providing apparatuses. The key transmission and maintenance require high safety, resulting in an increased system scale and cost.

SUMMARY OF THE INVENTION

It is, therefore, a principal object of the present invention to solve the above conventional problems and provide a network authentication system, method, and program, a service providing apparatus, a certificate authority, and a user terminal by which high-level security can be obtained without largely increasing the system scale.

To achieve the above object, according to an aspect of the present invention, there is provided a network authentication system comprising a service providing apparatus, a user terminal connected to the service providing apparatus via a communication network to perform authentication by using information of a user himself or herself, and a certificate authority for notifying, across a communication network, the service providing apparatus of a certificate indicating that the information of the user transmitted from the service providing apparatus via a communication network is valid, wherein the user terminal identifies the user by collation by using the information of the user, and notifies the service providing apparatus of the collation result via the communication network, and in accordance with the notification of the collation result from the user terminal, the service providing apparatus requests, via the communication network, the certificate authority to certify the validity of the collation result, and, if the validity of the collation result is certified by a certificate notified from the certificate authority, provides a predetermined service to the user on the basis of the collation result contained in the certificate.

According to another aspect of the present invention, there is provided a network authentication method comprising providing a user terminal connected to a service providing apparatus across a communication network to perform authentication by using biometrical information of a user himself or herself with respect to the service providing apparatus, and a certificate authority for notifying, across the communication network, the service providing apparatus of a certificate indicating that the information of the user transmitted from the service providing apparatus across the communication network is valid, wherein the user terminal identifies the user by collation by using the biometrical information of the user, and notifies the collation result to the service providing apparatus across the communication network, in response to this notification of the collation result from the user terminal, the service providing apparatus requests the certificate authority connected to the communication network to certify the validity of the collation result, in response to this request, the certificate authority certifies the validity of the collation result from the user terminal and notifies a certificate containing the collation result to the service providing apparatus across the communication network, and if the validity of the collation result is certified by the certificate from the certificate authority, the service providing apparatus provides a predetermined service to the user on the basis of the collation result contained in the certificate.

According to another aspect of the present invention, there is provided a network authentication method comprising providing a user terminal connected to a service providing apparatus via a communication network to perform authentication by using biometrical information of a user himself or herself with respect to the service providing apparatus, and a certificate authority for notifying, across the communication network, the service providing apparatus of a certificate indicating that the information of the user transmitted from the service providing apparatus via the communication network is valid, wherein the user terminal identifies the user by collation by using the biometrical information of the user, and notifies the collation result to the service providing apparatus via the communication network, in response to this notification of the collation result from the user terminal, the service providing apparatus requests the certificate authority connected to the communication network to certify the validity of the collation result, in response to this request, the certificate authority certifies the validity of the collation result from the user terminal and notifies a certificate containing the collation result to the service providing apparatus via the communication network, and if the validity of the collation result is certified by the certificate from the certificate authority, the service providing apparatus provides a predetermined service to the user on the basis of the collation result contained in the certificate.

According to still another aspect of the present invention, there is provided a service providing apparatus for use in a network authentication system in which when authentication is to be performed by using biometrical information of a user himself or herself between a user terminal and the service providing apparatus connected by a communication network, the authentication is performed on the basis of that certification of the validity of a collation result from the user terminal, which is performed by a certificate authority connected via the communication network, wherein in response to notification of the result of user collation performed using the biometrical information of the user in the user terminal, the service providing apparatus requests the certificate authority via the communication network to certify the validity of the collation result and, if the validity of the collation result is certified by a certificate notified from the certificate authority, provides a predetermined service to the user on the basis of the collation result contained in the certificate.

According to still another aspect of the present invention, there is provided a certificate authority for use in a network authentication system in which when authentication of a user is to be performed between a user terminal and a service providing apparatus connected by a communication network, the certificate authority connected via the communication network authenticates the validity of a collation result from the user terminal, wherein when, in response to notification of the result of user collation performed using the biometrical information of the user in the user terminal, requested to certify the validity of the collation result by the service providing apparatus via the communication network, the certificate authority certifies the validity of the collation result and notifies a certificate containing the collation result via the communication network, thereby allowing the service providing apparatus to provide a predetermined service to the user on the basis of the collation result contained in the certificate.

According to still another aspect of the present invention, there is provided a service providing apparatus for use in a network authentication system in which when authentication of a user is to be performed between a user terminal and the service providing apparatus connected by a communication network, a certificate authority connected via the communication network authenticates the validity of a collation result from the user terminal, wherein in response to the result of user collation in the user terminal, the service providing apparatus requests the certificate authority via the communication network to certify the validity of the collation result, and provides a predetermined service to the user on the basis of the collation result contained in a certificate notified from the certificate authority in response to the request.

BRIEF DESCRIPTION OF THE DRAWINGS

FIGS. 19A to 19C are timing charts showing the operation of the capacitance detection circuit; and FIG. 20 is a view for explaining a storage circuit of the user terminal.

DESCRIPTION OF THE PREFERRED EMBODIMENTS

Embodiments of the present invention will be described below with reference to the accompanying drawings.

Figure 1:
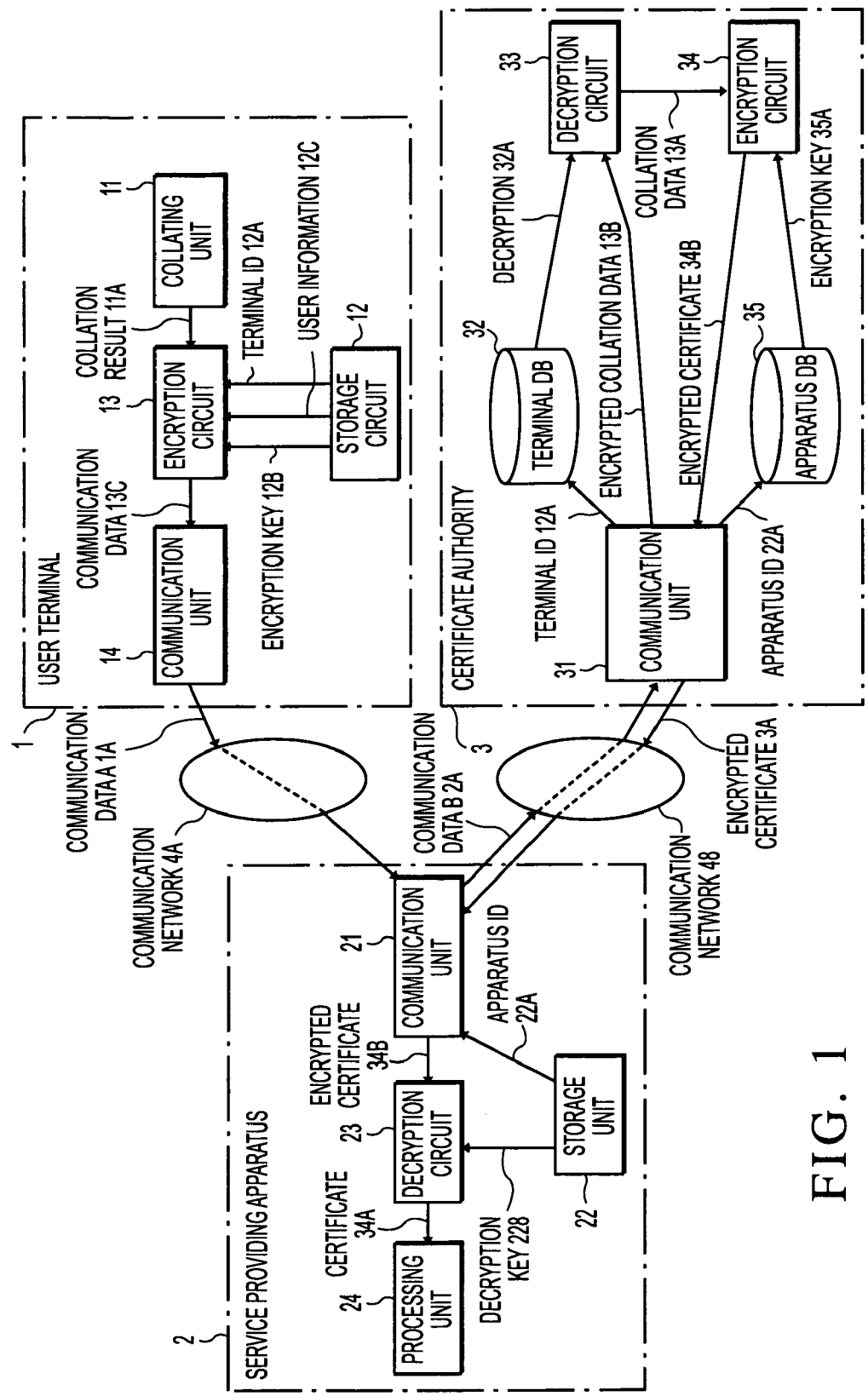
FIG. 1 a block diagram showing a network authentication system according to the first embodiment.

FIG. 1 shows a network authentication system according to the first embodiment of the present invention.

This network authentication system comprises a user terminal 1, a service providing apparatus 2, a certificate authority 3, and communication networks 4A and 4B such as the Internet or telephone networks. The user terminal 1 identifies a user himself or herself by collation by using biometrical information of the user. The service providing apparatus 2 provides a predetermined service to the user in accordance with the result of collation of the user. The certificate authority 3 certifies the validity of the collation result from the user terminal 1, as a third party independent of the user terminal 1 and the service providing apparatus 2. The communication networks 4A and 4B connect the user terminal 1, the service providing apparatus 2, and the certificate authority 3.

In the following description, a fingerprint is used as biometrical information. However, as this biometrical information it is also possible to use, e.g., a voiceprint, iris, handwriting, palm shape (finger joint length), vein pattern, or face layout pattern.

The user terminal 1 has a collating unit 11, an encryption circuit 13, a storage circuit 12, and a communication unit 14. The collating unit 11 identifies a user himself or herself by collation by using biometrical information of the user. The encryption circuit 13 encrypts a collation result 11A from the collating unit 11. The storage circuit 12 is connected to the encryption circuit 13 and prestores an encryption key (first encryption key) 12B for use in encryption, a terminal ID (terminal identification information) 12A, and user information 12C such as personal information of the user. The communication unit 14 receives communication data 13C from the encryption circuit 13 and transmits this communication data 13C to the communication network 4A. Note that the collating unit 11 includes, e.g., a sensor for acquiring a fingerprint image, a storage section for prestoring a fingerprint image of the user or registered data indicating the feature of the user's fingerprint, and a collating section for collating the fingerprint image from the sensor with the registered data in the storage section to output the collation result. Details of this collating unit will be described later by taking an example.

The service providing apparatus 2 has a communication unit 21, a decryption circuit 23, a storage circuit 22, and a processing unit 24. The communication unit 21 exchanges various data with the user terminal 1 or the certificate authority across the communication networks 4A and 4B. The decryption circuit 23 decrypts an encrypted certificate 34B received by the communication unit 21. The storage circuit 22 is connected to the decryption circuit 23 and prestores a decryption key (second decryption key) 22B for use in decryption of an encrypted certificate and an apparatus ID (apparatus identification information) 22A for identifying the service providing apparatus 2. The processing unit 24 receives a certificate 34A obtained by the decryption circuit 23 and performs processing on the basis of data, such as the collation result 11A from the user terminal 1, contained in this certificate 34A, thereby providing a predetermined service.

The certificate authority 3 has a communication unit 31, a terminal database (to be referred to as a terminal DB hereinafter) 32, a decryption circuit 33, an apparatus database (to be referred to as an apparatus DB hereinafter) 35, and an encryption circuit 34. The communication apparatus 31 exchanges various data with the service providing apparatus 2 via the communication network 4B. The terminal DB 32 stores a decryption key (first decryption key) 32A corresponding to the encryption key 12B of each user terminal 1. The decryption circuit 33 decrypts, by using the decryption key 32A stored in the terminal DB 32, encrypted collation data 13B contained in communication data B received by the communication unit 31. The apparatus DB 35 stores an encryption key (second encryption key) 35A corresponding to the decryption key 22B of each service providing apparatus 2. The encryption circuit 34 encrypts, as a certificate, original collation data 13A obtained by decryption by the decryption circuit 33, by using the encryption key 35A stored in the apparatus DB 35.

Note that the communication networks 4A and 4B need not be separate communication networks as described above but can be a single communication network.

The operation of this embodiment will be described below.

Figure 2:
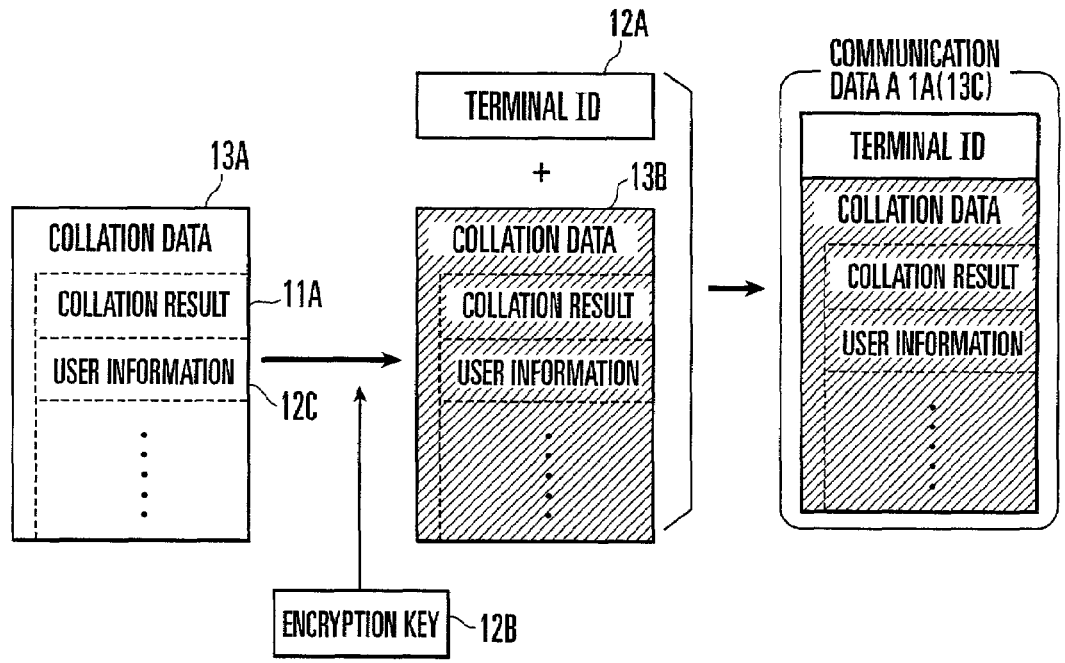
FIG. 2 is a view for explaining a process operation in a user terminal shown in FIG. 1.

First, the operation of the user terminal 1 will be explained with reference to FIG. 2. FIG. 2 explains a process operation in this user terminal.

To receive a service, a user operates the user terminal 1 to allow the collating unit 11 to sense biometrical information of the user himself or herself, and collate the obtained sensing data with the prestored registered data of the user. The collation result 11A is encrypted by the encryption circuit 13 by using the encryption key 12B stored in the storage circuit 12.

That is, the encryption circuit 13 forms collation data 13A by adding, where necessary, to the collation result 11A the personal user information 12C of the user, e.g., the name, address, telephone number, account number, and credit card number, stored in the storage circuit 12, and encrypts this collation data 13A by using the encryption key 12B. The encryption circuit 13 forms communication data A (13C) by adding to the encrypted collation data 13B obtained by encryption the terminal ID 12A stored in the storage circuit 12. The communication unit 14 transmits this communication data A (1A) to the service providing apparatus 2 across the communication network 4A.

Figure 3:
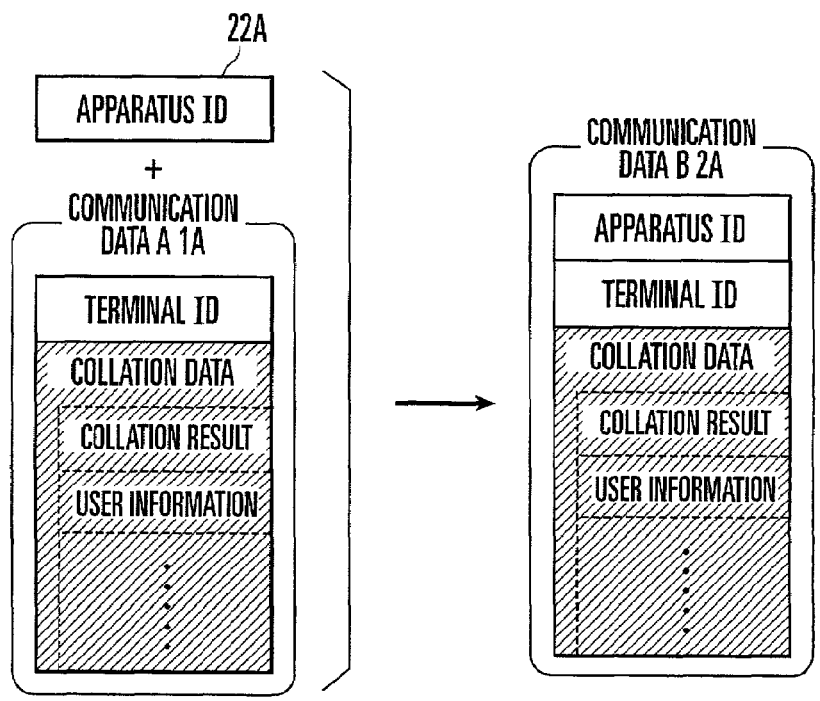
FIG. 3 is a view for explaining a process operation (communication data A receiving process) in a service providing apparatus shown in FIG. 1.

The operation of the service providing apparatus 2 when the communication data A is received will be described below with reference to FIG. 3. FIG. 3 is a view for explaining a process operation (communication data A receiving process) in the service providing apparatus.

In this service providing apparatus 2, when the communication unit 21 receives the communication data A (1A) from the user terminal 1, communication data B (2A) is formed by adding to the communication data A the apparatus ID 22A stored in the storage circuit 22. This communication data B (2A) is transmitted to the certificate authority 3 via the communication network 4B, thereby requesting the certificate authority 3 to certify the validity of the collation result notified from the user terminal 1.

Figure 4:
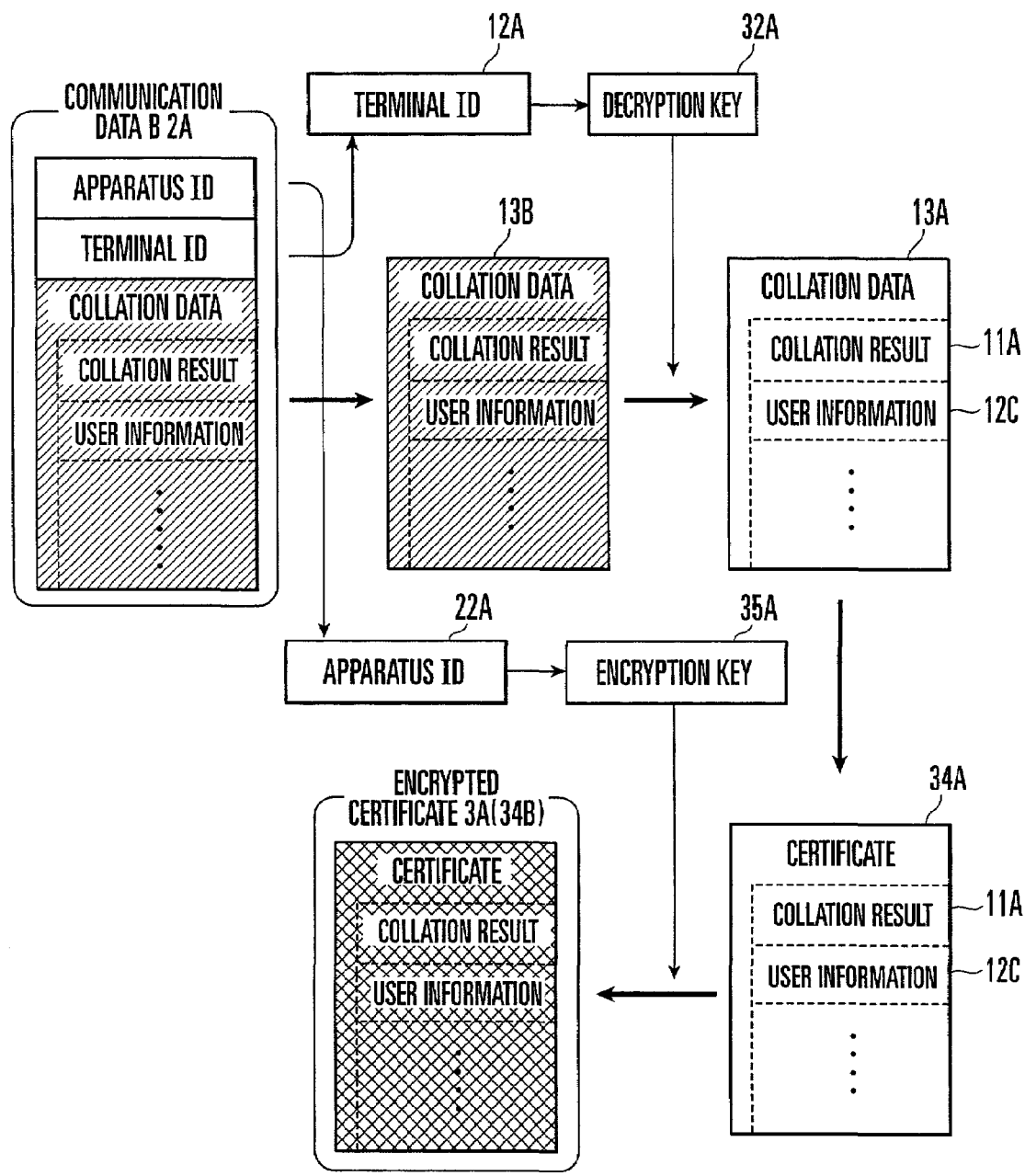
FIG. 4 is a view for explaining a process operation in a certificate authority shown in FIG. 1.

A process operation in the certificate authority 3 will be explained below with reference to FIG. 4.

When the communication unit 31 in the certificate authority 3 receives the communication data B (2A), the terminal DB 32 retrieves the decryption key 32A making a pair with the key stored in the user terminal 1, by using the terminal ID 12A added to the communication data B as a key. The decryption circuit 33 uses this decryption key 32A to decrypt the encrypted collation data 13B contained in the communication data B, thereby checking the validity of the data.

The decryption circuit 33 then outputs the collation data 13A containing the collation result 11A and the user information 12C.

Meanwhile, the apparatus DB 35 retrieves the encryption key 35A making a pair with the key stored in the service providing apparatus 2, by using the apparatus ID 22A added to the communication data B as a key. The encryption circuit 34 uses this encryption key 35A to encrypt the collation data 13A from the decryption circuit 33 as a certificate 34A, forming an encrypted certificate 34B. The communication unit 31 transmits this encrypted certificate 34B as an encrypted certificate 3A to the service providing apparatus 2 across the communication network 4B. If the decryption circuit 33 cannot decrypt the data by using the decryption key 32A and so the encrypted collation data 13B is not obtained, i.e., the validity of the collation result from the user terminal 1 is not obtained, the encryption circuit 34 forms an encrypted certificate of a certificate which indicates that no validity is obtained or which indicates failure of collation, and transmits this encrypted certificate to the service providing apparatus 2.

Figure 5:
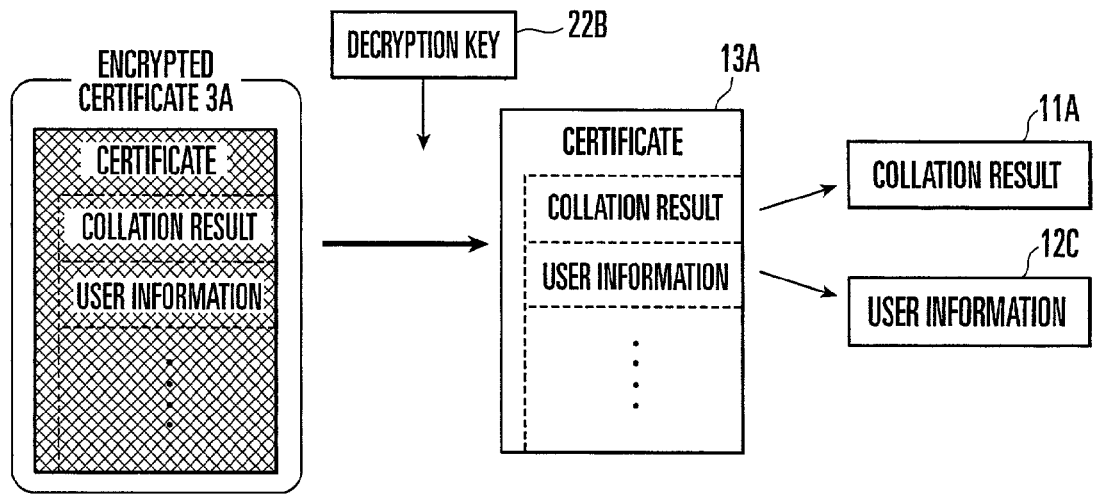
FIG. 5 is a view for explaining a process operation (encrypted certificate receiving process) in the service providing apparatus shown in FIG. 1.

FIG. 5 explains a process operation (communication data B receiving process) performed in the service providing apparatus 2 when the communication data B is received.

When the communication unit 21 in the service providing apparatus 2 receives the encrypted certificate 3A from the certificate authority 3, the decryption circuit 23 decrypts this encrypted certificate 3A by using the decryption key 22B stored in the storage circuit 22. On the basis of the collation result 11A contained in the obtained certificate 34A, the processing unit 24 determines whether to provide a service to the user. Only when the collation result 11A indicates success of collation and so it is determined that the service can be provided, processing for providing the service is performed. Consequently, the user can receive the provision of the service.

As described above, the user terminal 1 for identifying a user himself or herself by collation by using biometrical information of the user, the service providing apparatus 2 for providing a predetermined service to the user in accordance with the user collation result, and the certificate authority 3 for authenticating the collation result from the user terminal 1 are connected across the communication networks. In response to notification of the collation result from the user terminal 1, the service providing apparatus 2 requests the certificate authority 3 to certify the validity of the collation result. The certificate authority 3 authenticates the validity of the collation result and notifies the service providing apparatus 2 of the result of the authentication.

Accordingly, compared to the conventional system in which the service providing apparatus determines whether to provide a service on the basis of the collation result received directly from the user terminal, the certificate authority as a third party checks and authenticates the validity of the collation result, so high safety can be obtained. In addition, since this certificate authority can be easily shared by a plurality of user terminals and a plurality of service providing apparatuses, high-level security can be obtained without increasing the system scale and the maintenance cost.

Especially in this embodiment, when the user terminal 1 is to transfer the collation result to the certificate authority 3, an encryption scheme using the encryption key 12B and decryption key 32A corresponding to the user terminal 1 is used. When the certificate authority 3 is to transfer a certificate to the service providing apparatus 2, an encryption scheme using the encryption key 35A and decryption key 22B corresponding to the service providing apparatus 2 is used. The certificate authority 3 retrieves the decryption key 32A from the terminal DB 32 by using the terminal ID added to the collation result transmitted via the service providing apparatus 2 as a key, and retrieves the encryption key 35A from the apparatus DB 35 by using the apparatus ID similarly added to the collation result as a key.

Accordingly, the collation results and certificates based on the encryption schemes can be exchanged between a plurality of user terminals 1 and the certificate authority 3 and between the certificate authority 3 and a plurality of service providing apparatuses 2. As a consequence, high security for the collation results and certificates can be obtained.

Also, the decryption key of the user terminal and the encryption key of the service providing apparatus are unitarily managed by the certificate authority. This allows the user terminal to manage only its own encryption key and the service providing apparatus to manage only its decryption key. Therefore, the user terminal and the service providing apparatus need not manage and selectively use a plurality of keys. Compared to a system in which a plurality of keys are used, the scale of the apparatus can be decreased, and the speed of the authentication process can be increased.

Furthermore, the user terminal and the service providing apparatus need to register the encryption keys to the certificate authority only once. So, it is unnecessary to directly exchange encryption keys and decryption keys whenever authentication is performed. Accordingly, the keys can be handled with extremely high safety.

This embodiment is described on the assumption that user authentication is performed using biometrical information of the user. However, as far as the service providing apparatus and the certificate authority are concerned, user authentication at the user terminal need not be limited to that performed by biometrical information. That is, any information does not restrict the use of the service providing apparatus and the certificate authority of the present invention, provided that the information ensures the safety of user authentication at the user terminal.

In addition, when the user terminal 1 is to transmit the collation result 11A, the user information 12C containing personal information of the user is also transmitted together with the collation result 11A. Accordingly, this personal information of the user can also be transferred from the user terminal 1 to the processing unit 24 of the service providing apparatus 2 at the same time user authentication is performed.

Since this makes it unnecessary to separately notify authentication and personal information, it is possible to reduce the processing time required to provide a service and reduce the operation load on the user.

Furthermore, the certificate authority can raise the operating cost by charging the service provider whenever performing authentication. Consequently, economical and safe services can be provided to general users.

Figure 6:
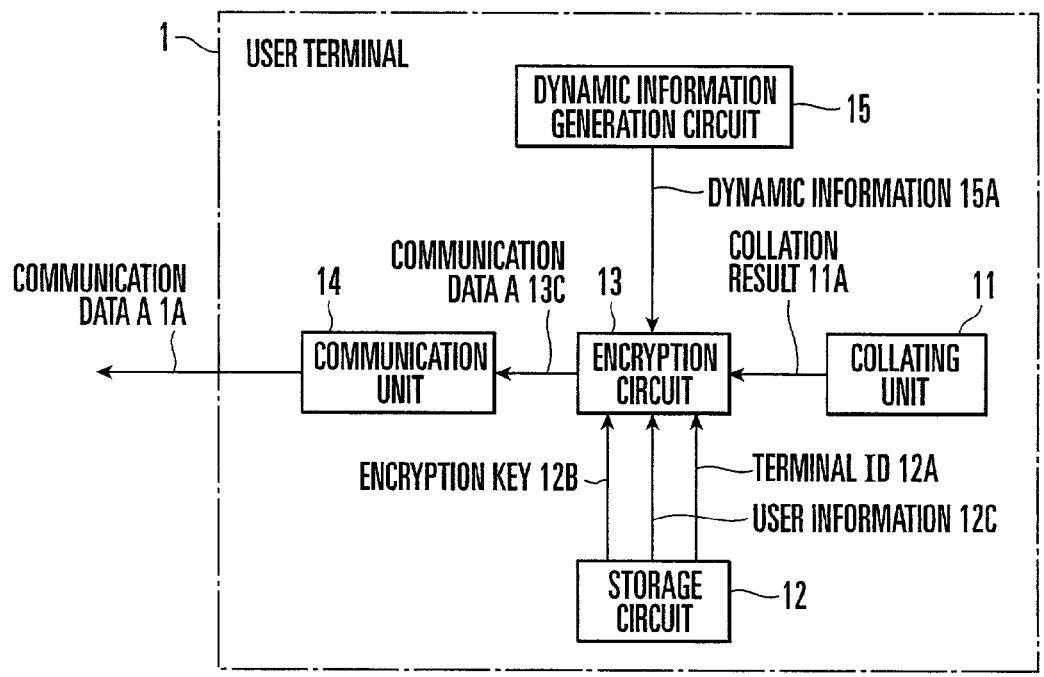
FIG. 6 is a block diagram showing a user terminal of a network authentication system according to the second embodiment.

FIG. 6 shows a user terminal of a network authentication system of the second embodiment according to the present invention. This user terminal 1 is the same as that of the first embodiment (FIG. 1) described above except that a dynamic information generation circuit 15 is included in the user terminal 1 and dynamic information generated by this dynamic information generation circuit 15 is input to an encryption circuit 13. "Dynamic information" herein mentioned means information which momently changes its contents whenever an information generation process is performed. Practical examples are a random number, date/time information, and counter.

Figure 7:
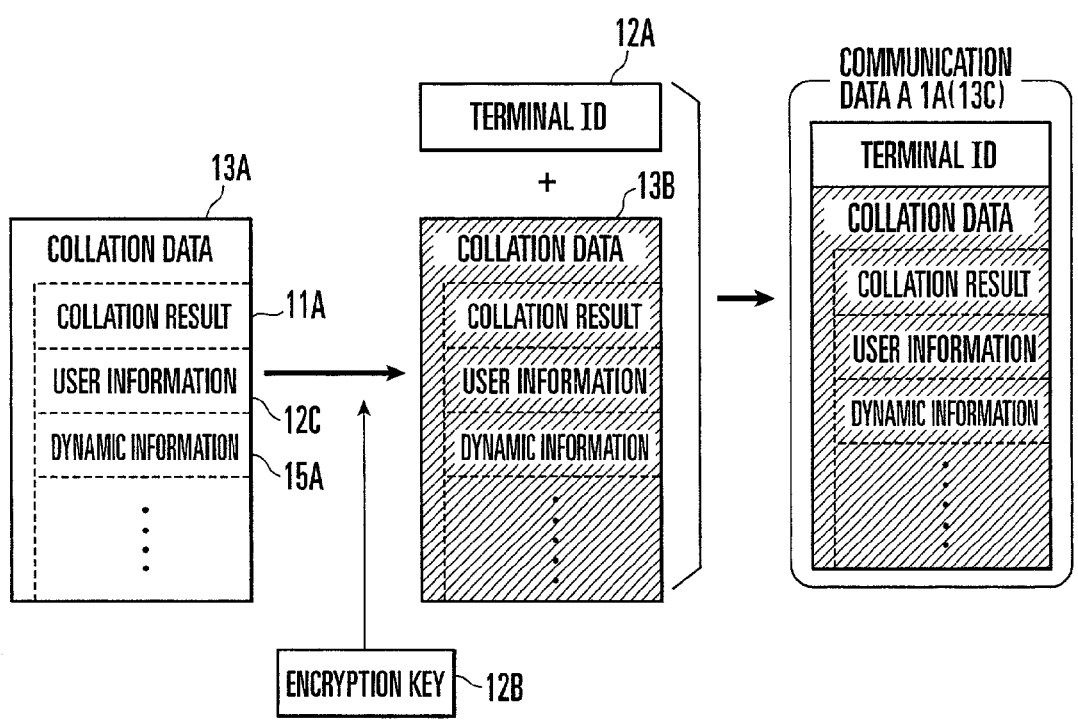
FIG. 7 is a view for explaining a process operation in the user terminal shown in FIG. 6.

As the operation of this embodiment, a process operation in the user terminal 1 will be explained below with reference to FIG. 7.

To receive a service, the user operates the user terminal 1 to allow a collating unit 11 to sense biometrical information of the user himself or herself, and collate the obtained sensing data with prestored registration data of the user. A collation result 11A is encrypted by the encryption circuit 13 by using an encryption key 12B stored in a storage circuit 12.

That is, the encryption circuit 13 adds, where necessary, to the collation result 11A personal user information 12C of the user, e.g., the name, address, telephone number, account number, and credit card number, stored in the storage circuit 12. The encryption circuit 13 forms collation data 13A by further adding to this collation result 11A dynamic information 15A obtained from the dynamic information generation circuit 15, and encrypts this collation data 13A by using the encryption key 12B. The encryption circuit 13 forms communication data A (13C) by adding a terminal ID 12A stored in the storage circuit 12 to an encrypted collation data 13B obtained by encryption.

A communication unit 14 transmits this communication data A (1A) to a service providing apparatus 2 across a communication network 4A.

In the user terminal 1 as described above, even when the collation result, terminal ID, and user information remain the same, momentarily changing dynamic information is added to data, so the contents of the encrypted collation data 13B obtained by encryption and the contents of the communication data A and B are always different data. Accordingly, even if communication data transmitted across a communication network is tapped, decryption of the data is difficult.

It is also possible to install in the user terminal and the certificate authority a common counter which increases its count whenever used, and use this count value instead of a random number. This can prevent any third party from posing as the user by using data copied by tapping.

Figure 8:
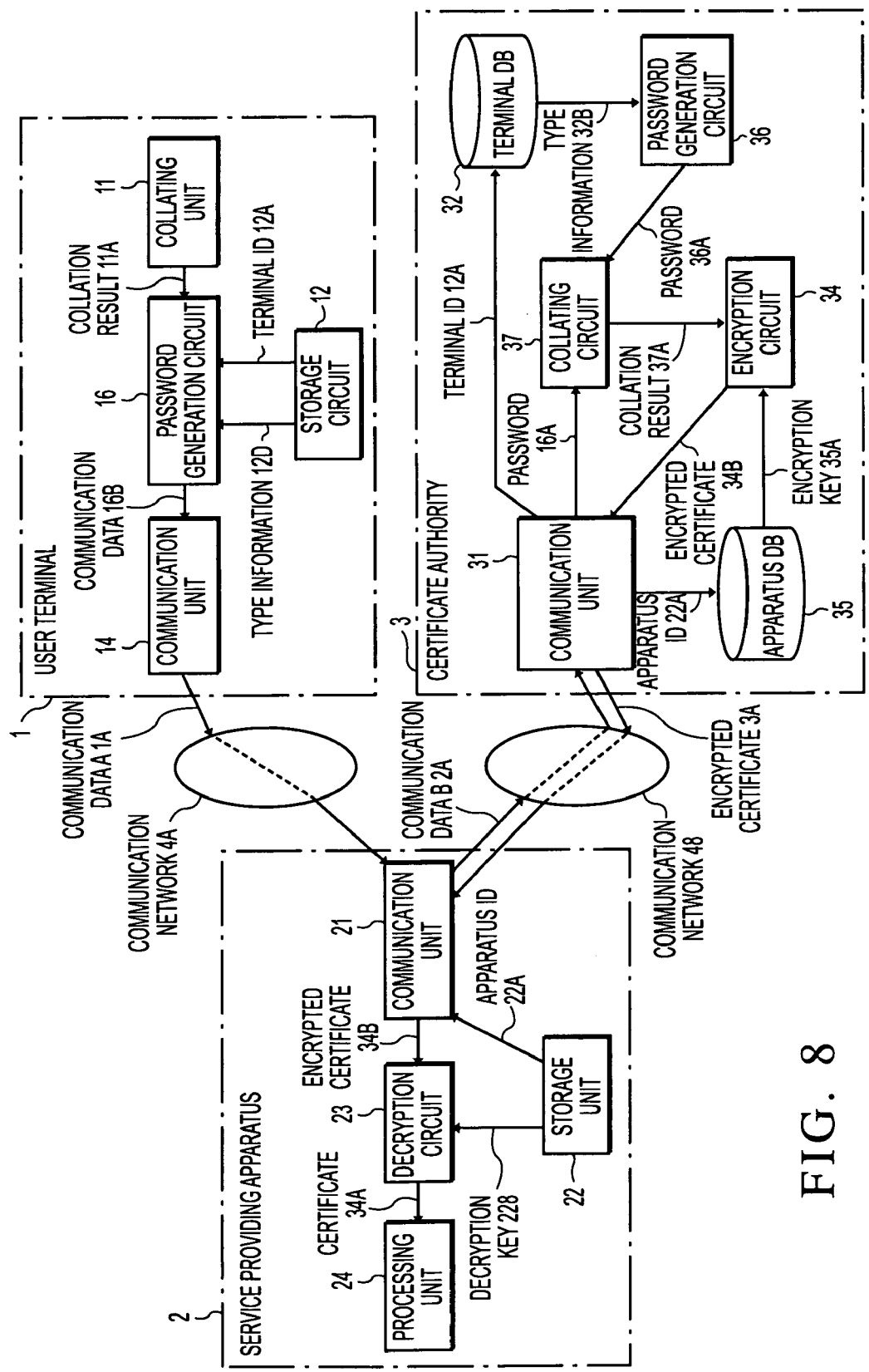
FIG. 8 is a block diagram showing a network authentication system according to the third embodiment.

A network authentication system according to the third embodiment of the present invention will be described below with reference to FIG. 8. In the above first and second embodiments, the collation result obtained in the user terminal 1 is transmitted to the certificate authority 3. In this third embodiment shown in FIG. 8, a password is generated and transmitted only when user collation is success in a user terminal 1, and a certificate authority 3 notifies a service providing apparatus 2 of the validity of the password from the user terminal 1 as the validity of user authentication.

The user terminal 1 has a password generation circuit 16 instead of the encryption circuit 13 of the first embodiment (FIG. 1). A storage circuit 12 prestores seed information 12D for generating a password 16A, instead of the encryption key 12B. This password seed information is necessary to generate a password and contains information representing the initial value of a calculation for password generation and information representing the extent to which this calculation is to be performed. The password generation circuit 16 can generate the same password for the same seed information at any time. The seed information cannot be obtained from the password, so correct information is necessary to generate a correct password. Since the seed information of a password cannot be obtained even if the password is tapped, the password cannot be forged.

In the certificate authority 3, a terminal DB 32 stores pieces of seed information 32B of individual user terminals in one-to-one correspondence with terminal IDs 12A of these user terminals. A password generation circuit 36 generates a password 36A from seed information 32B retrieved by this terminal DB 32. A collating circuit 37 collates the obtained password 36A with the password 16A from the user terminal 1.

This embodiment has the same arrangement as the first embodiment except the foregoing.

The operation of this embodiment will be explained below.

First, a process operation in the user terminal 1 will be described with reference to FIG. 9.

Figure 9:
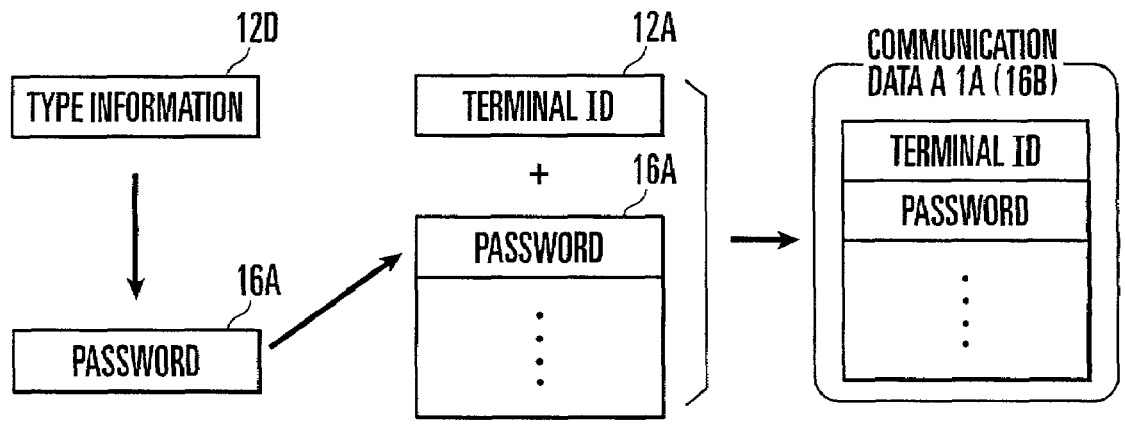
FIG. 9 is a view for explaining a process operation in a user terminal shown in FIG. 8.
Figure 10:
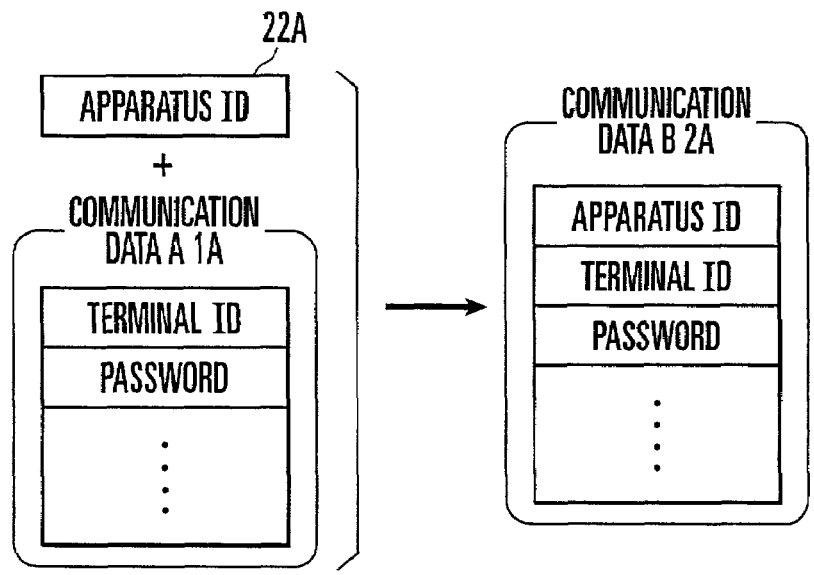
FIG. 10 is a view for explaining a process operation (communication data A receiving process) in a service providing apparatus shown in FIG. 8.

As shown in FIG. 9, only when a collation result 11A from a collating unit 11 indicates success of user collation, the password generation circuit 16 reads out the seed information 12D from the storage circuit 12 and generates the password 16A unique to the user terminal 1. The password generation circuit 16 forms communication data 16B by adding the terminal ID 12A to this password 16A, and transmits this communication data 16B as communication data A. As shown in FIG. 10, a communication unit 21 of the service providing apparatus 2 adds an apparatus ID 22A to the received communication data A and transmits the data as communication data B. If user collation is unsuccessful, password generation and communication data transmission need not be performed. In this case, data (password) indicating the collation failure can be transmitted as the communication data A.

Figure 11:
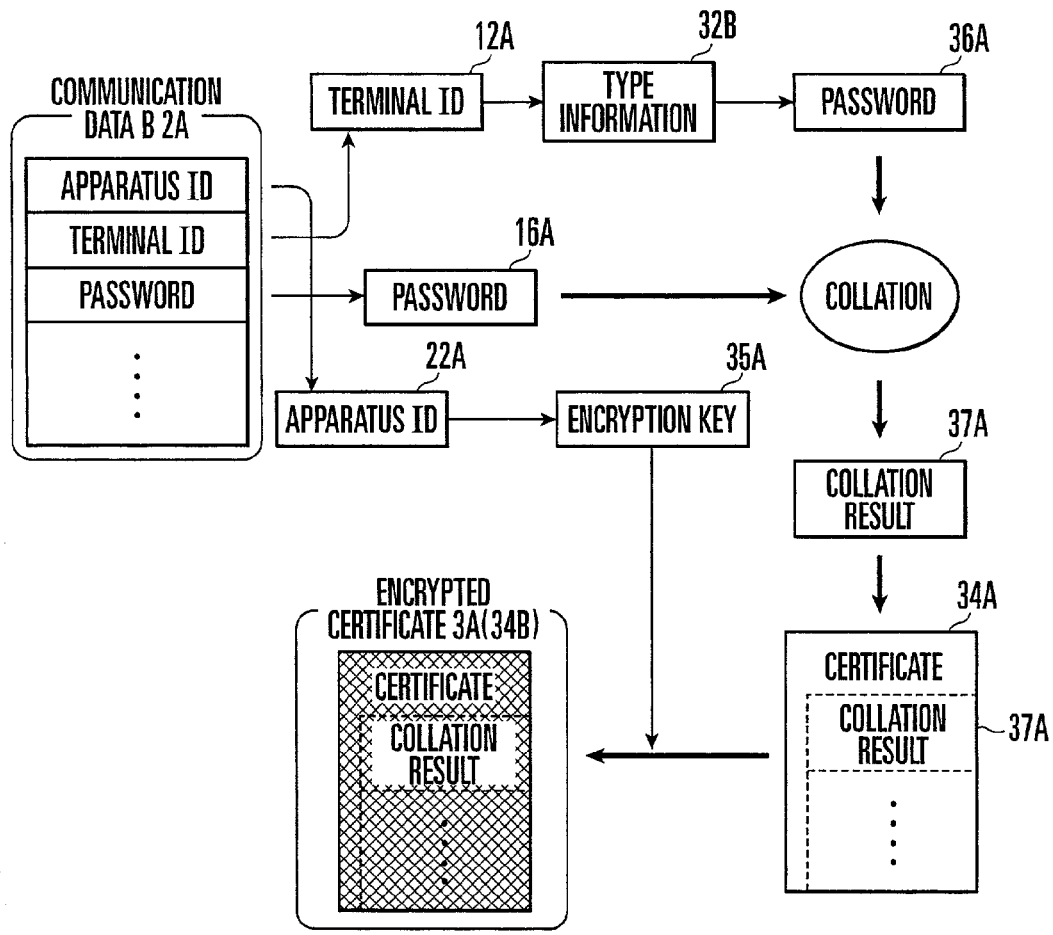
FIG. 11 is a view for explaining a process operation in a certificate authority shown in FIG. 8.

A process operation in the certificate authority 3 will be described next with reference to FIG. 11.

The terminal DB 32 of the certificate authority 3 retrieves seed information 32B corresponding to the terminal ID 12A contained in the communication data B received by a communication unit 31. The password generation circuit 36 uses this seed information 32B to generate a password 36A. The collating circuit 37 collates this password 36A with the password 16A contained in the communication data B received by the communication unit 31, and outputs a collation result 37A. An encryption circuit 34 forms a certificate 34A by regarding this collation result 37A as the collation result from the user terminal 1, and forms an encrypted certificate 34B by using an encryption key 35A retrieved from an apparatus DB 35 on the basis of the apparatus ID 22A which is also contained in the communication data B.

Figure 12:
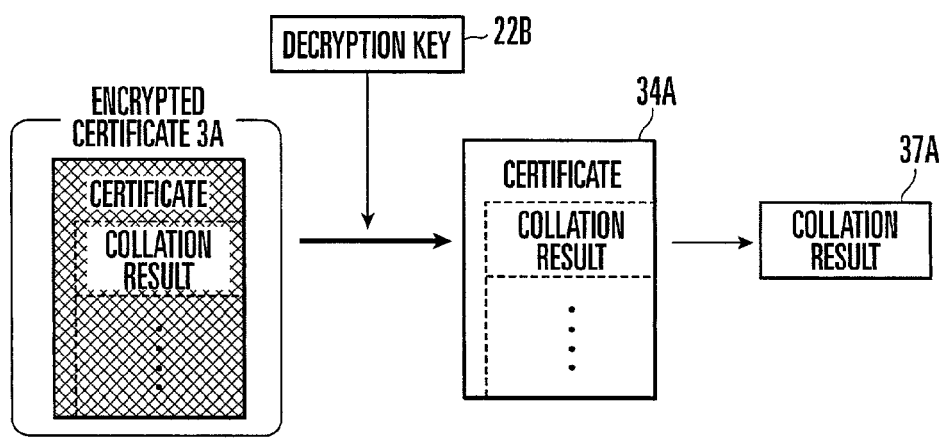
FIG. 12 is a view for explaining a process operation (encrypted certificate receiving process) in the service providing apparatus shown in FIG. 8.

A process operation (communication data B receiving process) performed by the service providing apparatus 2 when the communication data B is received will be explained below with reference to FIG. 12.

The encrypted certificate 34B formed by the encryption circuit 34 of the certificate authority 3 is transmitted as an encrypted certificate 3A from the communication unit 31 to the service providing apparatus 2 across a communication network 4B.

In the service providing apparatus 2, a decryption circuit 23 decrypts this encrypted certificate 3A by using a decryption key 22B stored in a storage circuit 22. On the basis of the collation result 37A contained in the obtained certificate 34A, a processing unit 24 determines whether to provide a service to the user. Only when the collation result 37A indicates success of collation and so it is determined that the service can be provided, processing for providing the service is performed. Consequently, the user can receive the service.

As described above, the user terminal 1 notifies the certificate authority 3 of the collation result in the user terminal 1 by using a password, instead of encrypting the collation result. Since the processing amount in the user terminal 1 can be reduced, it is possible to simplify and downsize the user terminal and reduce the cost of the user terminal. Also, a password changes whenever generated on the basis of the seed information 12D, so the communication data A and B change accordingly. Therefore, even if these communicate data A and B are tapped, decryption of the data is difficult. This can prevent the posing of the user by any third party.

Furthermore, as in the first and second embodiments described above, user information and dynamic information can be added to the communication data 16B.

Figure 13:
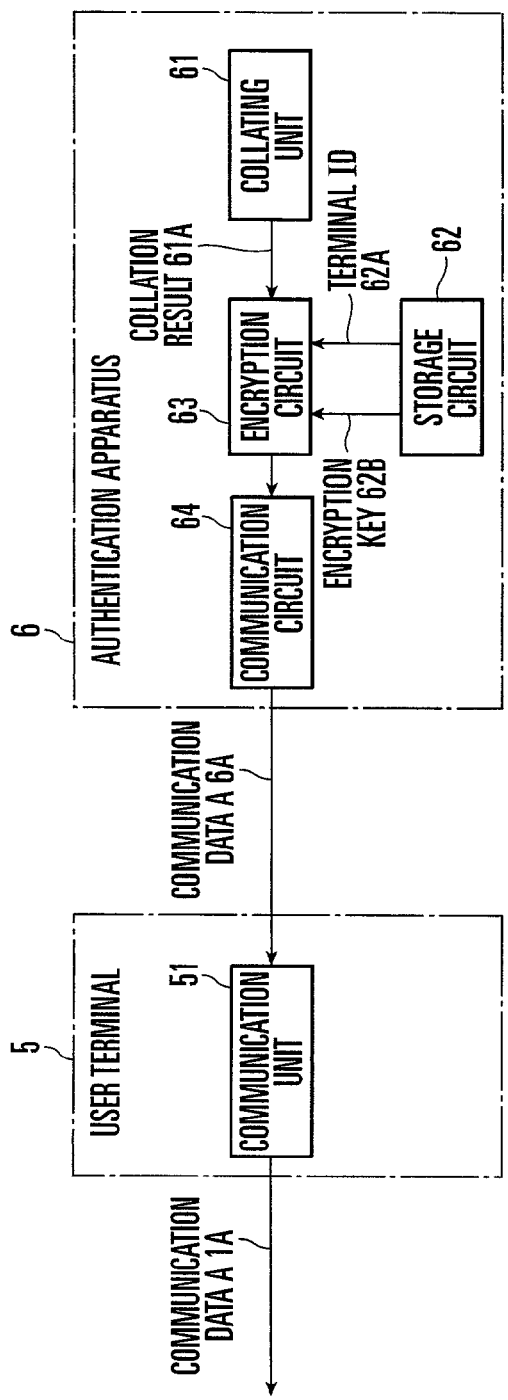
FIG. 13 is a block diagram showing a user terminal and an authentication apparatus of a network authentication system according to the fourth embodiment.
Figure 14:
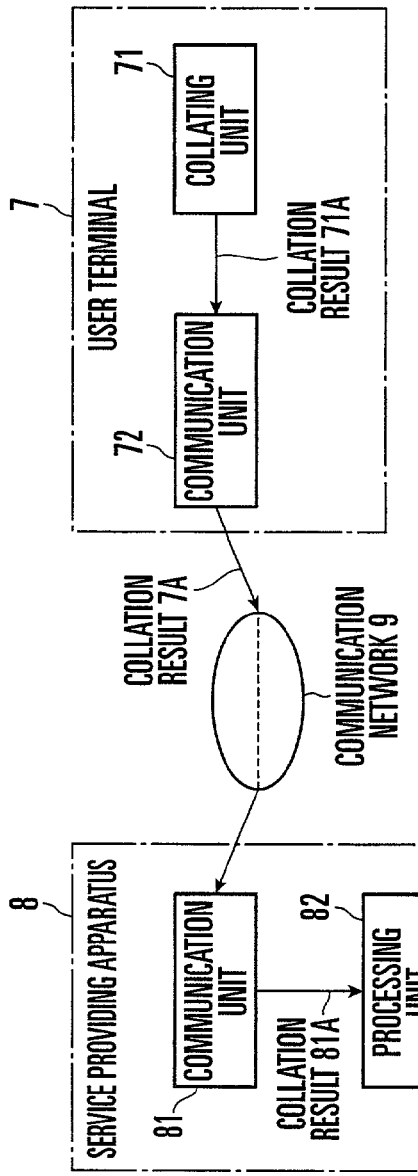
FIG. 14 is a block diagram showing a conventional network authentication system.
Figure 15:
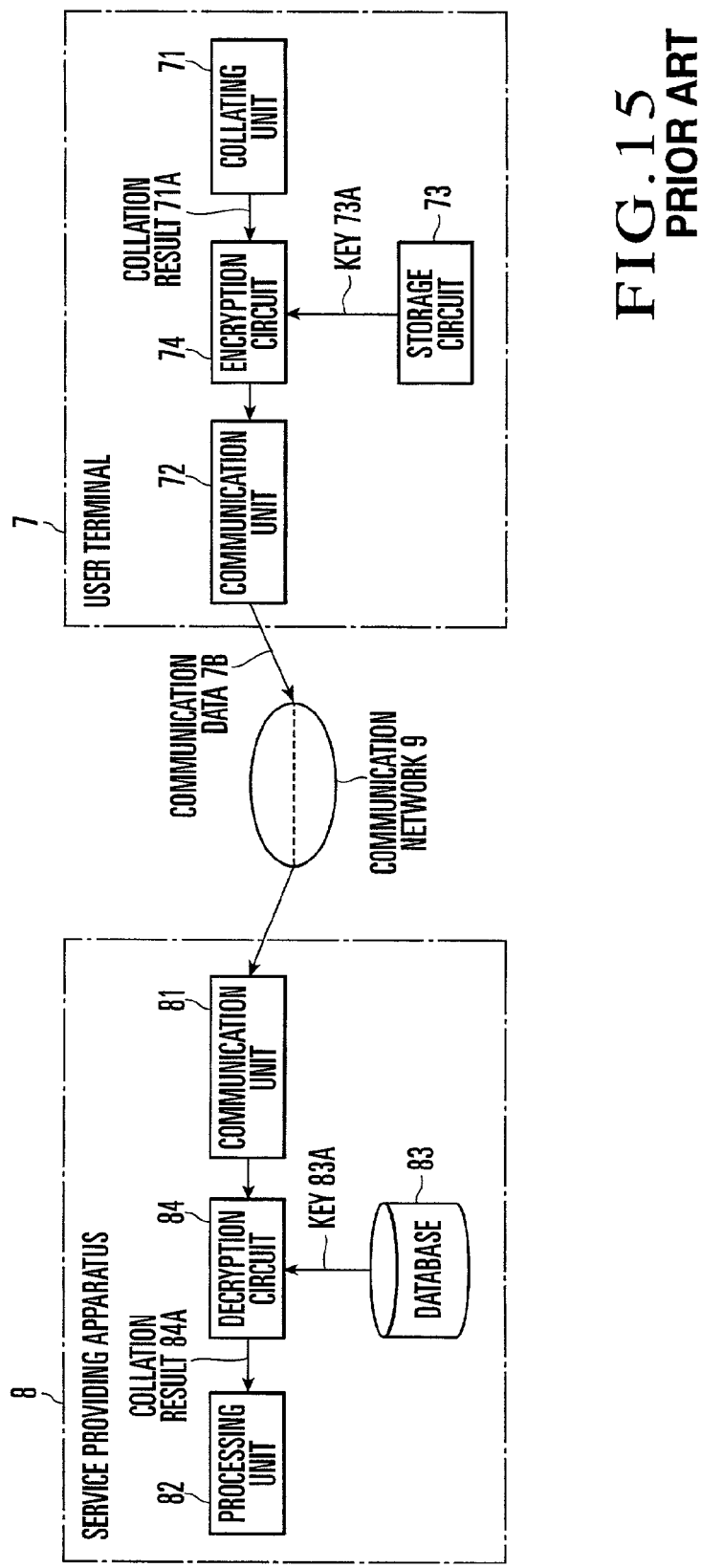
FIG. 15 is a block diagram showing another conventional network authentication system.

A user terminal of a network authentication system according to the fourth embodiment of the present invention will be described below with reference to FIG. 13. This embodiment is the same as the first embodiment (FIG. 1) described earlier except that a user terminal 5 such as a general PC or telephone containing a communication unit 51 is used in place of the user terminal 1, and that user collation is separately performed in an authentication apparatus (user terminal) 6.

A collating unit 61, a collation result 61A, a storage circuit 62, a terminal ID 62A, an encryption key 62B, an encryption circuit 63, and communication data 6A in the authentication apparatus 6 correspond to the collating unit 11, the collation result 11A, the storage circuit 12, the terminal ID 12A, the encryption key 12B, the encryption circuit 13, and the communication data 13C, respectively, of the user terminal 1 explained in the first embodiment. Likewise, the communication unit 51 of the user terminal 5 corresponds to the communication unit 14. Also, the authentication apparatus 6 has a communication circuit 64 for transmitting output communication data 63C from the encryption circuit 63 as the communication data 6A to the user terminal 5.

Process operations are analogous to those described previously; the collating unit 61 performs user collation, the encryption circuit 63 encrypts the collation result 61A by using the encryption key 62B stored in the storage circuit 62, and the communication circuit 64 transmits the communication data 63C as the communication data 6A to the user terminal 5. The communication unit 51 of this user terminal 5 transmits the data as the communication data A.

Data communication between the authentication apparatus 6 and the user terminal 5 can also be performed by directly connecting the communication circuit 64 of the authentication apparatus 6 and the communication unit 51 of the user terminal 5. It is also possible to give these communication circuit 64 and communication unit 51 a function of performing radio communication to communicate data via a radio zone.

As described above, the authentication apparatus 6 separated from the user terminal is used, so any general apparatus can be used as the user terminal which performs data communication by using a communication network. Since the user need only have the authentication apparatus 6, it is possible to simplify the system and reduce the cost of the system. Also, various services can be used because a general apparatus is used as the user terminal.

Although this embodiment is explained on the basis of the first embodiment, the embodiment is similarly applicable to the second or third embodiment, and functions and effects similar to those described above can be obtained.

The authentication apparatus 6 can be implemented as a very small apparatus by the use of the technologies (e.g., Japanese Patent Laid-Open No. 2000-242771) of forming a sensor, storage circuit, collating circuit, and the like as a one-chip semiconductor device. This dramatically improves the portability. In addition, user registered data for use in collation is not output to the outside, so a leak of the registered data for use in collation can be prevented. Furthermore, even when a user terminal is to be shared by many and unspecified users, a sensor for detecting biometrical information need not be shared by these users. Therefore, a sensor failure of a certain user has no influence on the other users. Also, even when a portion of a body must be brought into contact with a sensor to sense biometrical information, e.g., a fingerprint, a sanitary environment can be maintained for each user.

The service providing apparatus 2, the user terminal 1, and the certificate authority 3 in each embodiment described above can be configured using computers. When this is the case, the functions of individual units and circuits of each of the service providing apparatus 2, the user terminal 1, and the certificate authority 3 are implemented by cooperatively using these hardware resources and programs (software resources) executed by a microprocessor for controlling the hardware resources. These programs can be prerecorded on a recording medium such as a ROM, hard disk, or CD-ROM and loaded into and executed by the microprocessor as needed.

Next, the configuration of the collating unit 11 will be explained with reference to FIG. 16.

This collating unit 11 includes a sensor 111, a storage circuit 113, and a collating circuit 115. The sensor 111 senses a fingerprint pattern (biometrical information) and outputs the information as sensing data 112. The storage circuit 113 stores registered fingerprint data 114 generated beforehand from fingerprint data of a user himself or herself. The collating circuit 115 collates the sensing data 112 from the sensor 111 with the registered fingerprint data 114 stored in the storage circuit 113, and outputs a collation result 11A indicating success/failure of authentication of the user in accordance with the degree of matching/mismatching.

These sensor 111, storage circuit 113, and collating circuit 115 configuring the collating unit 11 are integrated on the same semiconductor substrate.

A very small collating unit 11 can be realized by using the technologies (e.g., Japanese Patent Laid-Open No. 2000-242771) of forming these circuits as a one-chip LSI semiconductor device.

Note that collation data for use in authentication by the collating unit 11 is generated beforehand from a fingerprint data of the user himself or herself by a predetermined registering operation, and registered in the storage circuit 113.

A practical configuration of the sensor 111 constructing the collating unit 11 will be explained below with reference to FIG. 17.

This sensor 111 includes a plurality of square sensor electrodes 315 of, e.g., 80 µm side and a lattice-like ground electrode 316 on a dielectric interlayer 314 formed on a lower insulating film 312 on a semiconductor substrate 311 made of, e.g., silicon. The plurality of sensor electrodes 315 and the ground electrode 316 are arranged on the same plane defined by the surface of the dielectric interlayer 314.

The sensor electrodes 315 are formed at intervals of 150 µm and covered with a passivation film 317 formed on the dielectric interlayer 314. Each sensor electrode 315 is made of Au and has a film thickness of about 1 µm. Since the film thickness of the passivation film 317 is about 3 µm, this passivation film 37 is present by a thickness of approximately 2(=3−1) µm on the sensor electrodes 315. The passivation film 317 is formed by an insulator such as polyimide having a relative dielectric constant of about 4.0.

On the lower insulating film 312, interconnections 313 connected to the sensor electrodes 315 via through holes are formed. On the semiconductor substrate 311, capacitance detection circuits 318 for detecting capacitances formed in the sensor electrodes 315 are formed.

Each capacitance detection circuit 318 is connected to the sensor electrode 315 by the interconnection 313. This capacitance detection circuit 318 is formed for each sensor electrode 315 and detects a capacitance formed between the sensor electrode 315 and a portion of an object (finger) to be sensed.

The output side of each capacitance detection circuit 318 is connected to the collating circuit 115 and outputs to this collating circuit 115 fingerprint data obtained by converting the capacitance formed in the sensor electrode 315 into a halftone image.

The capacitance detection circuits 318, the collating circuit 115, and the storage circuit 113 are formed on the semiconductor substrate 311 below the sensor electrodes 315. This makes a one-chip configuration of the collating unit 11 feasible. Another example of this one-chip unit is disclosed in, e.g., Japanese Patent Laid-Open No. 2000-242771.

Figure 17:
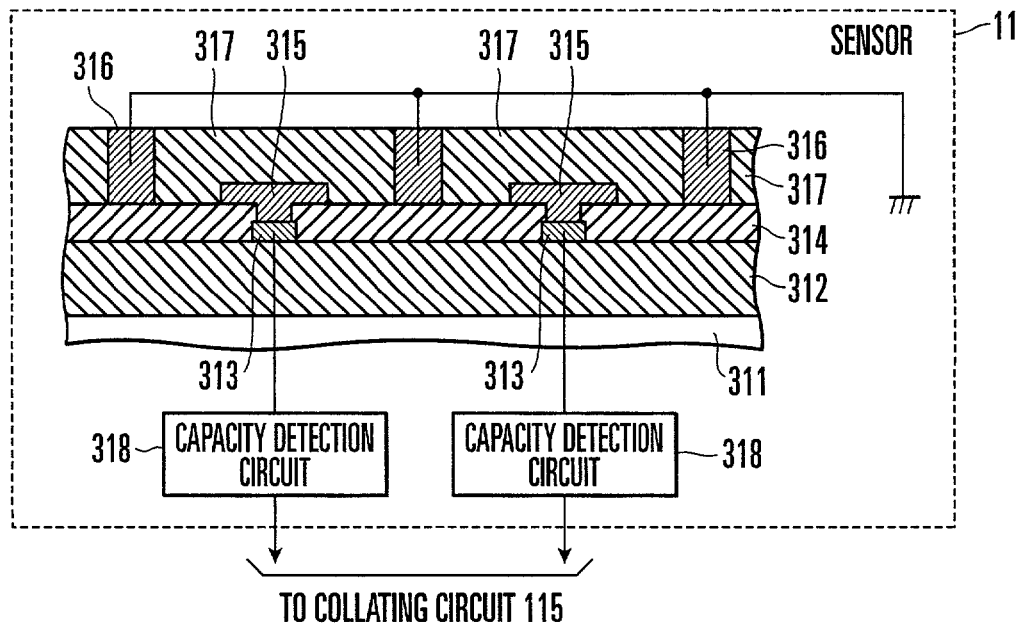
FIG. 17 is a sectional view showing the arrangement of a sensor.
Figure 18:
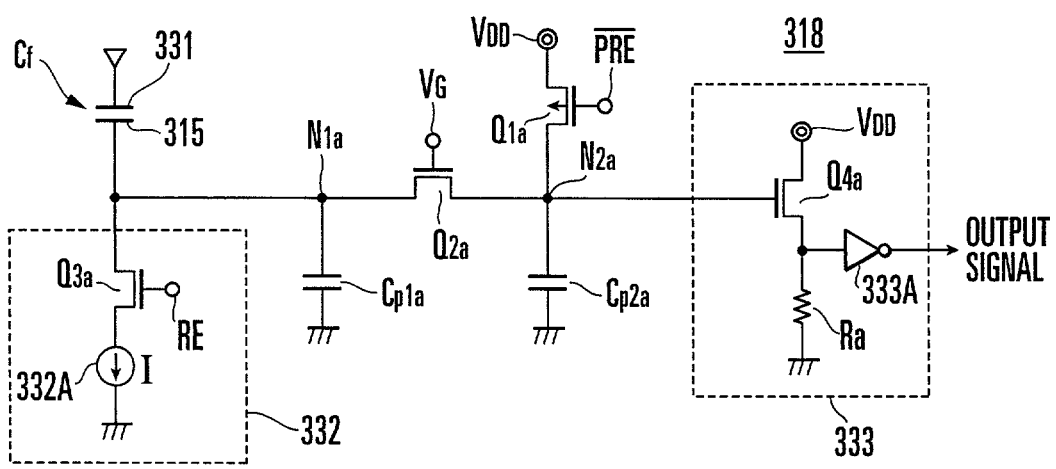
FIG. 18 is a circuit diagram showing the configuration of a capacitance detection circuit of the sensor.

FIG. 18 shows a practical configuration of the capacitance detection circuit 318 shown in FIG. 17. Reference symbol Cf denotes a capacitance formed between the sensor electrode 315 shown in FIG. 17 and a finger skin 331. The sensor 315 forming this capacitance Cf is connected to the drain terminal of an N-channel (Nch) MOS transistor Q3a. The source terminal of this transistor Q3a is connected to the input side of a current source 332A of an electric current I.

A node N1a between the sensor electrode 315 and the transistor Q3a is connected to the source terminal of an Nch MOS transistor (first element) Q2a. A node N2a between the drain terminal of this transistor Q2a and the drain terminal of a P-channel (Pch) MOS transistor (first switching means) Q1a is connected to the gate terminal of an Nch MOS transistor Q4a having a drain terminal to which a power supply voltage VDD is applied and a source terminal connected to the ground via a resistor R1. An inverter gate 333A is connected to the source terminal of this transistor Q4a.

Signals $\overline{PRE}$ and RE are applied to the gate terminals of the transistors Q1a and Q3a, respectively. Also, a bias voltage VG is applied from a constant voltage source to the gate terminal of the transistor Q2a. Letting Vth denote a gate-source threshold voltage by which the transistor Q2a is turned off, the voltages VDD and VG are so set that VDD>VG−Vth.

The nodes N1a and N2a have parasitic capacitances Cp1a and Cp2a, respectively.

The current source 332A and the transistor Q3a construct a signal generation circuit 332. The transistor Q4a, the resistor Ra, and the inverter gate 333A construct an output circuit 333.

FIGS. 19A to 19C explain the operation of the capacitance detection circuit 318. FIG. 19A shows a potential change of the signal $\overline{PRE}$ for controlling the transistor Q1a. FIG. 19B shows a potential change of the signal RE for controlling the transistor Q3a. FIG. 19C shows potential changes at the nodes N1a and N2a.

Initially, the signal $\overline{PRE}$ of High level (VDD) is applied to the gate terminal of the transistor Q1a, and the signal RE of Low level (GND) is applied to the gate terminal of the transistor Q3a. Accordingly, neither the transistor Q1a nor Q3a is turned on.

When the signal $\overline{PRE}$ changes from High level to Low level in this state, the transistor Q1a is turned on. In this state, the transistor Q3a is kept OFF, and the signal generation circuit 332 is not in operation. Therefore, the potential of the node N2a is precharged to VDD.

In addition, the node N1a is charged until the gate-source voltage of the transistor Q2a reaches the threshold voltage Vth to turn off this transistor Q2a. Accordingly, the potential of the node N1a is precharged to VG−Vth.

When the signal $\overline{PRE}$ changes to High level after the precharge is completed, the transistor Q1a is turned off. When the signal RE changes to High level at the same time, the transistor Q3a is turned on, and this renders the signal generation circuit 332 operative.

The electric charge stored in the node N1a by the current source 332A is extracted, so the potential of this node N1a slightly lowers. Consequently, the gate-source voltage of the transistor Q2a exceeds the threshold voltage Vth to turn on this transistor Q2a. Accordingly, the electric charge in the node N2a is also extracted, so the potential of this node N2a starts lowering.

Letting $\Delta t$ denote a period during which the signal RE is High level, a potential drop $\Delta V$ at the node N1a after the elapse of $\Delta t$ is VDD−(VG−Vth)+I$\Delta t$/(Cf+Cp1a). Assume that the parasitic capacitance Cp2a is much smaller than the parasitic capacitance Cp1a.

The electric current I of the current source 332A, the period $\Delta t$, and the parasitic capacitances Cp1a and Cp2a are constant. Therefore, the potential drop $\Delta V$ is determined by the value Cf of the capacitance produced between the sensor electrode 315 and the finger surface 331 as an object to be sensed. Since this capacitance value Cf is determined by the distance between the sensor electrode 315 and the finger surface 331, the capacitance value Cf changes in accordance with the ridge/valley of the skin surface. Accordingly, the potential drop $\Delta V$ changes in accordance with the ridge/valley of the skin surface. Since this potential drop $\Delta V$ is supplied as an input signal to the output circuit 333, this output circuit 333 receives $\Delta V$ and outputs a signal reflecting the ridge/valley of the skin surface.

An output signal from each capacitance detection circuit 318 is supplied as the aforementioned fingerprint image data to the collating circuit 115. The collating circuit 115 authenticates the user by collating this fingerprint image data with the registered fingerprint image data prestored in the storage circuit 113.

Figure 16:
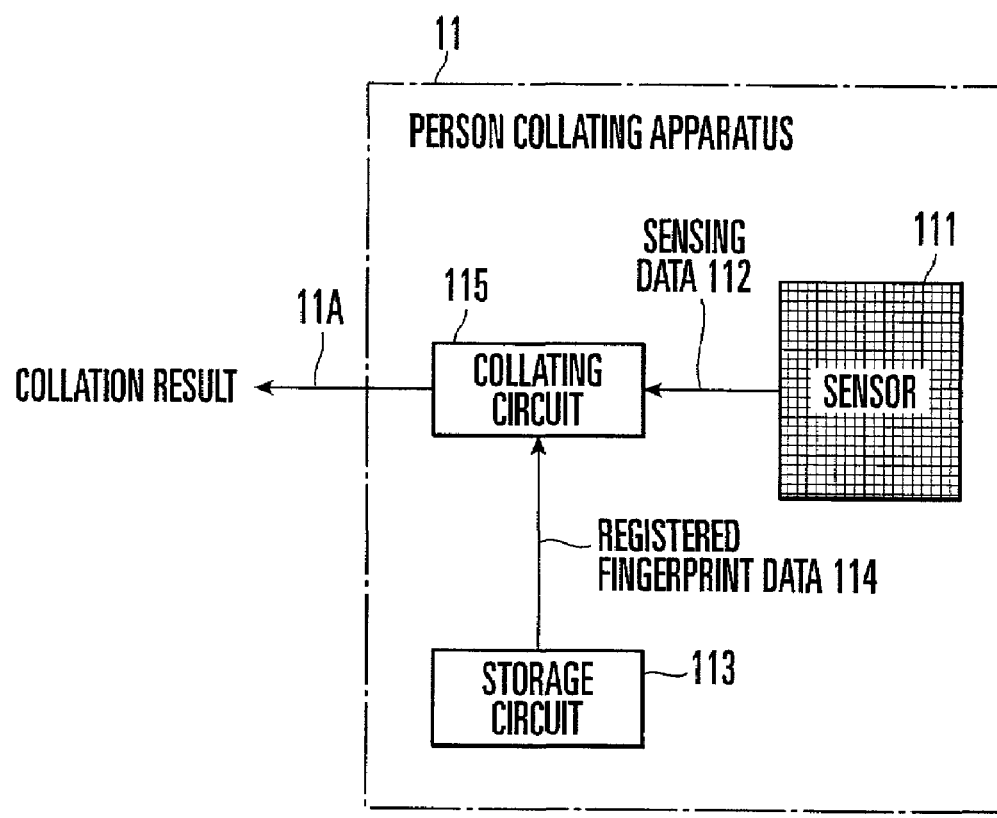
FIG. 16 is a block diagram showing a collating apparatus.

Referring to FIG. 16, the sensor 111, the collating circuit 115, and the storage circuit 113 in the collating unit 11 are formed into one chip. However, it is also possible to form the sensor 111 into one chip, connect this sensor 111 to the collating circuit 115 via a bus, and connect the collating circuit 115 to the storage circuit 113 via a bus. Alternatively, it is possible to form the sensor 111 and the collating circuit 115 into one chip, and connect this chip to the storage circuit 113 via a bus.

The storage circuit 12 in the user terminal 1 will be described below with reference to FIG. 20.

In each embodiment described above, as shown in FIG. 20, it is possible to form three different storage areas 12X, 12Y, and 12Z in the storage circuit 12 to store various pieces of information.

In this example, the storage area 12X stores the registered fingerprint data 12A for use in fingerprint authentication. The storage area 12Y stores the user (personal) information (e.g., the name, address, birth date, and credit card number) of the owner of the user terminal.

The storage area 12Z stores service information (e.g., a password, user terminal identification information, use date/time, coin locker door number, gate opening/closure, concert title, ATM account number, electronic commercial transaction password, telephone directory, and e-mail address) concerning services.

Generally, the user terminal 1 stores only registered fingerprint data and outputs to the outside only the result of authentication of a user himself or herself. However, a configuration like this restricts systems to which this user terminal is applicable.

In contrast to this, when various pieces of information are stored as shown in FIG. 20, these pieces of information and processed information obtained by processing these pieces of information can be exchanged with the service providing apparatus 2 where necessary. Consequently, the user can receive various services by using the user terminal.

As described above, the present invention includes a certificate authority which, in response to a request for certification of the validity of a collation result transmitted from a user terminal via a communication network, certifies the validity of the collation result and notifies a certificate including this collation result via the communication network. The user terminal identifies a user himself or herself by collation by using biometrical information of the user, and notifies a service providing apparatus of this collation result via the communication network. In response to this notification of the collation result from the user terminal, the service providing apparatus requests via the communication network the certificate authority to certify the validity of the collation result. If the validity of the collation result is certified by a certificate notified from the certificate authority, the service providing apparatus provides a predetermined service to the user on the basis of the collation result contained in the certificate.

Accordingly, compared to the conventional system in which a service providing apparatus determines whether to provide a service on the basis of the collation result received directly from a user terminal, the certificate authority as a third party checks and authenticates the validity of the collation result. Consequently, high safety can be obtained. In addition, the certificate authority can be readily shared by a plurality of user terminals and a plurality of service providing apparatuses. Therefore, high-level security can be obtained without increasing the system scale and the maintenance cost.

What is claimed is:

1. A network authentication system comprising:
a service providing apparatus;
a user terminal connected to said service providing apparatus via a communication network to perform authentication by using information of a user himself or herself;
and a certificate authority for notifying, via a communication network, said service providing apparatus of a certificate indicating that the information of the user transmitted from said service providing apparatus via a communication network is valid, wherein said user terminal identifies the user by collation by using the information of the user and biometrical information of the user stored in a storage circuit in the user terminal, and notifies said service providing apparatus of the collation result via said communication network, and
in accordance with the notification of the collation result from said user terminal, said service providing apparatus requests, via said communication network, said certificate authority to certify the validity of the collation result, and, if the validity of the collation result is certified by a certificate notified from said certificate authority, said service providing apparatus provides a predetermined service to the user on the basis of the collation result contained in the certificate.

2. A system according to claim 1, wherein said system further comprises a collating unit for identifying the user by collation by using biometrical information of the user, a storage circuit for storing first encryption key information for use in said user terminal and terminal identification information of said user terminal, an encryption circuit for encrypting the collation result from said collating unit by using the first encryption key information and outputting the encrypted collation result by adding the terminal identification information, and a communication unit for transmitting communication data from said encryption circuit as first communication data to said service providing apparatus,
said user terminal comprises at least a communication unit,
said service providing apparatus comprises a storage circuit for storing second decryption key information for use in said service providing apparatus and apparatus identification information of said service providing apparatus, a communication unit for adding the apparatus identification information to the first communication data received from said user terminal and transmitting the data as second communication data to said certificate authority, thereby requesting said certificate authority to certify the collation result from said user terminal, and receiving an encrypted certificate from said certificate authority, a decryption circuit for decrypting, by using the second decryption key information, the encrypted certificate received by said communication unit and outputting the original certificate, thereby checking the certification of the validity of the collation result, and a processing unit for performing processing for a service on the basis of that collation result from said user terminal which is contained in the certificate from said decryption circuit,
and said certificate authority comprises a communication unit for receiving the second communication data from said service providing apparatus and transmitting the encrypted certificate to said service providing apparatus, a terminal database for retrieving a first decryption key corresponding to the first encryption key by using the terminal identification information contained in the second communication data received by said communication unit as a key, a decryption circuit for decrypting the second communication data by using the first decryption key retrieved by said terminal database and outputting the collation result from said user terminal, thereby checking the validity of the collation result, an apparatus database for retrieving a second encryption key corresponding to the second decryption key by using the apparatus identification information contained in the second communication data as a key, and an encryption circuit for encrypting, by using the second encryption key retrieved by said apparatus database, a certificate containing the valid collation result obtained by said decryption circuit, thereby forming an encrypted certificate, and outputting the encrypted certificate to said communication unit.

3. A system according to claim 2, wherein
said storage circuit of said user terminal prestores user information which is unique to the user and to be used in processing by said service providing apparatus,
said encryption circuit of said user terminal encrypts, together with the collation result, the user information read out from said storage circuit, and outputs the encrypted data as the communication data, said decryption circuit of said certificate authority decrypts the collation result and user information contained in the communication data, said encryption circuit of said certificate authority encrypts the collation result and user information from said decryption circuit as a certificate, thereby forming an encrypted certificate, and said processing circuit of said service providing apparatus performs processing by using the user information contained in the certificate from said decryption circuit.

4. A system according to claim 2, wherein said user terminal further comprises a dynamic information generation circuit for generating dynamic information which momently changes its contents, and said encryption circuit of said user terminal encrypts, together with the collation result, the dynamic information obtained from said dynamic information generation circuit, and outputs the encrypted data as the communication data.

5. A system according to claim 4, wherein said collating circuit, said encryption circuit, said storage circuit, and said dynamic information generation circuit are formed in an authentication apparatus independent of said user terminal.

6. A system according to claim 2, wherein said collating circuit, said encryption circuit, and said storage circuit are formed in an authentication apparatus independent of said user terminal.

7. A system according to claim 1, wherein said system further comprises a collating unit for identifying the user by collation by using biometrical information of the user, a storage circuit for storing first seed information for use in password generation in said user terminal and terminal identification information of said user terminal, a password generation circuit for generating a first password by using the first seed information only when the collation result from said collating unit indicates success of collation, and outputting the first password and the terminal identification information as communication data indicating the collation result, and a communication unit for transmitting to said service providing apparatus the communication data from said password generation circuit as first communication data, said user terminal incorporates at least said communication unit, said service providing apparatus comprises a storage circuit for storing second decryption key information for use in said service providing apparatus and apparatus identification information of said service providing apparatus, a communication unit for adding the apparatus identification information to the first communication data received from said user terminal and transmitting the data as second communication data to said certificate authority, thereby requesting said certificate authority to certify the collation result from said user terminal, and receiving an encrypted certificate from said certificate authority, a decryption circuit for decrypting, by using the second decryption key information, the encrypted certificate received by said communication unit and outputting the original certificate, thereby checking the certification of the validity of the collation result, and a processing unit for performing processing for a service on the basis of the collation result contained in the certificate from said decryption circuit, and said certificate authority comprises a communication unit for receiving the second communication data from said service providing apparatus and transmitting the encrypted certificate to said service providing apparatus, a terminal database for retrieving second seed information corresponding to the first seed information by using the terminal identification information contained in the second communication data received by said communication unit as a key, a password generation circuit for generating a second password by using the second seed information retrieved by said terminal database, a collating circuit for collating the second password with the first password contained in the second communication data to check the validity of the first password corresponding to the collation result from said user terminal, an apparatus database for retrieving a second encryption key corresponding to the second decryption key by using the apparatus identification information contained in the second communication data as a key, and an encryption circuit for encrypting, by using the second encryption key retrieved by said apparatus database, a certificate containing the collation result obtained by said collating circuit, thereby forming an encrypted certificate, and outputting this encrypted certificate to said communication unit.

8. A system according to claim 7, wherein said collating circuit, said password generation circuit, and said storage circuit are formed in an authentication apparatus independent of said user terminal.

9. A system according to claim 1, wherein said user terminal comprises a storage circuit for storing personal information of the user, service information concerning services provided by said service providing apparatus, and registered information for use in collation of the user himself or herself, and the personal information, service information, and registered information are stored in different storage areas.

10. A network authentication method comprising providing:

a service providing apparatus;

a user terminal connected to the service providing apparatus across a communication network to perform authentication by using biometrical information of a user himself or herself with respect to the service providing apparatus; and a certificate authority for notifying, across the communication network, the service providing apparatus of a certificate indicating that the information of the user transmitted from the service providing apparatus across the communication network is valid, wherein the user terminal identifies the user by collation by using the biometrical information of the user, and notifies the collation result to the service providing apparatus across the communication network, in response to this notification of the collation result from the user terminal, the service providing apparatus requests the certificate authority connected to the communication network to certify the validity of the collation result, in response to this request, the certificate authority certifies the validity of the collation result from the user terminal and notifies a certificate containing the collation result to the service providing apparatus across the communication network, and if the validity of the collation result is certified by the certificate from the certificate authority, the service providing apparatus provides a predetermined service to the user on the basis of the collation result contained in the certificate.

11. A method according to claim 10, wherein the user terminal identifies the user by collation by using the biometrical information of the user, encrypts the collation result from the collating unit by using a first encryption key used in the user terminal, adds terminal identification information of the user terminal to output the data as communication data, and transmits this communication data as first communication data to the service providing apparatus, the user terminal comprises at least a function of adding the terminal identification information of the user terminal to output the data as communication data, the service providing apparatus adds apparatus identification information of the service providing apparatus to the first communication data received from the user terminal to transmit the data as second communication data to the certificate authority, thereby requesting the certificate authority to certify the collation result from the user terminal, the certificate authority receives the second communication data from the service providing apparatus, retrieves from a terminal database first decryption key information corresponding to first encryption key information by using the terminal identification information contained in the second communication data as a key, decrypts the second communication data by using the retrieved first decryption key information to output the collation result from the user terminal, thereby checking the validity of the collation result, retrieves from an apparatus database second encryption key information corresponding to second decryption key information for use in the service providing apparatus by using the apparatus identification information contained in the second communication data as a key, encrypts, by using the retrieved second encryption key information, a certificate containing the valid collation result obtained by the decryption to form an encrypted certificate, and transmits this encrypted certificate to the service providing apparatus, and the service providing apparatus receives the encrypted certificate from the certificate authority, decrypts this encrypted certificate by using the second decryption key information to output the original certificate, thereby checking the certification of the validity of the collation result from the certificate authority, and performs processing for a service on the basis of that collation result from the user terminal which is contained in the certificate from a decryption circuit.

12. A method according to claim 11, wherein an authentication apparatus independent of and connected to the user terminal performs those processes, which are performed in the user terminal, of identifying the user by collation by using the biometrical information of the user, encrypting the collation result from the collating unit by using first encryption key information for use in the user terminal, and adding the terminal identification information of the user terminal to output the data as communication data.

13. A method according to claim 10, wherein the user terminal encrypts, together with the collation result, the user information for use in processing by the service providing apparatus, and outputs the encrypted information as the communication data, the certificate authority decrypts the collation result and user information contained in the communication data, and encrypts the collation result and user information as a certificate to form an encrypted certificate, and the service providing apparatus performs processing by using the user information contained in the certificate.

14. A method according to claim 10, wherein the user terminal encrypts, together with the collation result, dynamic information which momently changes its contents, and outputs the encrypted information as the communication data.

15. A method according to claim 10, wherein the user terminal identifies the user by collation by using the biometrical information of the user, generates a first password by using first seed information of the user terminal, outputs the first password and terminal identification information of the user terminal as communication data indicating the collation result, and transmits the communication data as first communication data to the service providing apparatus, the service providing apparatus adds apparatus identification information of the service providing apparatus to the first communication data received from the user terminal to transmit the data as second communication data to the certificate authority, thereby requesting the certificate authority to certify the collation result from the user terminal, the certificate authority receives the second communication data from the service providing apparatus, retrieves from a terminal database second seed information corresponding to the first seed information by using the terminal identification information contained in the second communication data as a key, generates a second password by using the retrieved second seed information, collates the second password with the first password contained in the second communication data to check the validity of the first password corresponding to the collation result from the user terminal, retrieves from an apparatus database a second encryption key corresponding to a second decryption key for use in the service providing apparatus by using the apparatus identification information contained in the second communication data as a key, encrypts, by using the retrieved second encryption key, a certificate containing the valid collation result obtained by the password collation to form an encrypted certificate, and transmits this encrypted certificate to the service providing apparatus, and the service providing apparatus receives the encrypted certificate from the certificate authority, decrypts the encrypted certificate by using the second decryption key to output the original certificate, thereby checking the certification of the validity of the collation result from the certificate authority, and performs processing for a service on the basis of that collation result from the user terminal which is contained in the certificate from a decryption circuit.

16. A program stored on a computer readable medium, that when executed by a processor, performs authentication by controlling a user terminal connected to a service providing apparatus via a communication network to perform authentication by using information of a user himself or herself with respect to the service providing apparatus, and a certificate authority for notifying, via the communication network, the service providing apparatus of a certificate indicating that the information of the user transmitted from the service providing apparatus via the communication network is valid, comprising the steps of:

causing the user terminal to identify the user by collation by using the information of the user and the biometrical information of the user stored in a storage circuit in the user terminal, and notify the collation result to the service providing apparatus via the communication network;

in response to the notification of the collation result from the user terminal, causing the service providing apparatus to request the certificate authority connected to the communication network to certify the validity of the collation result;

in response to this request, causing the certificate authority to certify the validity of the collation result from the user terminal and notify a certificate containing the collation result to the service providing apparatus via the communication network; and if the validity of the collation result is certified by the certificate from the certificate authority, causing the service providing apparatus to provide a predetermined service to the user on the basis of the collation result contained in the certificate.

17. A program stored on a computer readable medium according to claim 16, further comprising the steps of:

identifying the user by collation by using the biometrical information of the user, encrypting the collation result from a collating unit by using first encryption key information for use in the user terminal, adding terminal identification information of the user terminal to output the data as communication data, and transmitting this communication data as first communication data to the service providing apparatus, the user terminal having a function of adding the terminal identification information of the user terminal to output the data as communication data, and transmitting the communication data as first communication data to the service providing apparatus;

causing the service providing apparatus to add apparatus identification information of the service providing apparatus to the first communication data received from the user terminal to transmit the data as second communication data to the certificate authority, thereby requesting the certificate authority to certify the collation result from the user terminal;

causing the certificate authority to receive the second communication data from the service providing apparatus, retrieve from a terminal database a first decryption key corresponding to the first encryption key by using the terminal identification information contained in the second communication data as a key, decrypt the second communication data by using the retrieved first decryption key to output the collation result from the user terminal, thereby checking the validity of the collation result, retrieve from an apparatus database a second encryption key corresponding to a second decryption key for use in the service providing apparatus by using the apparatus identification information contained in the second communication data as a key, encrypt, by using the retrieved second encryption key, a certificate containing the valid collation result obtained by the decryption to form an encrypted certificate, and transmit this encrypted certificate to the service providing apparatus; and causing the service providing apparatus to receive the encrypted certificate from the certificate authority, decrypt the encrypted certificate by using the second decryption key to output the original certificate, thereby checking the certification of the validity of the collation result from the certificate authority, and perform processing for a service on the basis of that collation result from the user terminal which is contained in the certificate from a decryption circuit.

18. A program stored on a computer readable medium according to claim 17, further comprising the steps of:

causing the user terminal to encrypt, together with the collation result, the user information for use in processing by the service providing apparatus, and output the encrypted information as the communication data;

causing the certificate authority to decrypt the collation result and user information contained in the communication data, and encrypt the collation result and user information as a certificate to form an encrypted certificate; and causing the service providing apparatus to perform processing by using the user information contained in the certificate.

19. A program stored on a computer readable medium according to claim 17, further comprising the step of causing the user terminal to encrypt, together with the collation result, dynamic information which momently changes its contents, and output the encrypted information as the communication data.

20. A program stored on a computer readable medium according to claim 17, further comprising the step of causing an authentication apparatus independent of and connected to the user terminal to perform those processes, which are performed in the user terminal, of identifying the user by collation by using the biometrical information of the user, encrypting the collation result from the collating unit by using a first encryption key for use in the user terminal, and adding the terminal identification information of the user terminal to output the data as communication data.

21. A program stored on a computer readable medium according to claim 16, further comprising the steps of:

causing the user terminal to identify the user by collation by using the biometrical information of the user, generate a first password by using first seed information of the user terminal, output the first password and terminal identification information of the user terminal as communication data indicating the collation result, and transmit the communication data as first communication data to the service providing apparatus;

causing the service providing apparatus to add apparatus identification information of the service providing apparatus to the first communication data received from the user terminal to transmit the data as second communication data to the certificate authority, thereby requesting the certificate authority to certify the collation result from the user terminal;

causing the certificate authority to receive the second communication data from the service providing apparatus, retrieve from a terminal database second seed information corresponding to the first seed information by using the terminal identification information contained in the second communication data as a key, generate a second password by using the retrieved second seed information, collate the second password with the first password contained in the second communication data to check the validity of the first password corresponding to the collation result from the user terminal, retrieve from an apparatus database a second encryption key corresponding to a second decryption key for use in the service providing apparatus by using the apparatus identification information contained in the second communication data as a key, encrypt, by using the retrieved second encryption key, a certificate containing the valid collation result obtained by the password collation to form an encrypted certificate, and transmit this encrypted certificate to the service providing apparatus; and causing the service providing apparatus to receive the encrypted certificate from the certificate authority, decrypt the encrypted certificate by using the second decryption key to output the original certificate, thereby checking the certification of the validity of the collation result from the certificate authority, and perform processing for a service on the basis of that collation result from the user terminal which is contained in the certificate from the decryption circuit.

22. A service providing apparatus for use in a network authentication system in which when authentication is to be performed by using biometrical information of a user himself or herself between a user terminal and said service providing apparatus connected by a communication network, the authentication is performed on the basis of that certification of the validity of a collation result from said user terminal, which is performed by a certificate authority connected via the communication network, wherein in response to notification of the result of user collation performed using the biometrical information of the user in said user terminal, said service providing apparatus requests said certificate authority via the communication network to certify the validity of the collation result and, if the validity of the collation result is certified by a certificate notified from said certificate authority, provides a predetermined service to the user on the basis of the collation result contained in the certificate.

23. An apparatus according to claim 22, wherein said service providing apparatus comprises a storage circuit for storing decryption key information for use in decryption of the encrypted certificate from said certificate authority and apparatus identification information of said service providing apparatus, and a communication unit for adding the apparatus identification information to first communication data which is transmitted from said user terminal and which contains the collation result encrypted by said user terminal, transmitting the data as second communication data to said certificate authority, thereby requesting said certificate authority to certify the collation result from said user terminal, and receiving the encrypted certificate from said certificate authority.

24. An apparatus according to claim 22, wherein said service providing apparatus comprises a storage circuit for storing a decryption key for use in decryption of the encrypted certificate in said service providing apparatus and apparatus identification information of said service providing apparatus, a communication unit for adding the apparatus identification information to first communication data received from said user terminal to transmit the data as second communication data to said certificate authority, thereby requesting said certificate authority to certify the validity of the collation result from said user terminal, and receiving the encrypted certificate from said certificate authority, a decryption circuit for decrypting, by using the second decryption key, the encrypted certificate received by said communication unit to output the original certificate, thereby checking that certification of the validity of the collation result which is performed by said certificate authority, and a processing unit for performing processing for a service on the basis of the collation result contained in the certificate from said decryption circuit.

25. A certificate authority for use in a network authentication system in which when authentication is to be performed using biometrical information of a user himself or herself between a user terminal and a service providing apparatus connected by a communication network, the authentication is performed on the basis of that certification of the validity of a collation result from said user terminal, which is performed by said certificate authority connected via the communication network, wherein when, in response to notification of the result of user collation performed using the biometrical information of the user in said user terminal, requested to certify the validity of the collation result by said service providing apparatus via the communication network, said certificate authority certifies the validity of the collation result and notifies a certificate containing the collation result across the communication network, thereby allowing said service providing apparatus to provide a predetermined service to the user on the basis of the collation result contained in the certificate.

26. An authority according to claim 25, wherein said certificate authority comprises a communication unit for receiving communication data which is transmitted from said service providing apparatus and which contains the collation result encrypted by said user terminal, and transmitting an encrypted certificate to said service providing apparatus, a terminal database for retrieving first decryption key information corresponding to first encryption key information for use in encryption of the collation result in said user terminal, by using that terminal identification information of said service providing apparatus which is contained in the communication data received by said communication unit, a decryption circuit for decrypting the communication data by using the first decryption key information retrieved by said terminal database, thereby checking the validity of the collation result, an apparatus database for retrieving second encryption key information corresponding to second decryption key information for use in said service providing apparatus by using the apparatus identification information as a key, and an encryption circuit for encrypting, by using the second encryption key information retrieved by said apparatus database, a certificate containing the valid collation result obtained by said decryption circuit, thereby forming the encrypted certificate, and outputting the encrypted certificate to said communication unit.

27. An authority according to claim 26, wherein
said decryption circuit decrypts, together with the collation result from the communication data, that user information unique to the user which is encrypted in said user terminal together with the collation result and which is used in processing by said service providing apparatus, and
said encryption circuit encrypts the collation result and user information from said decryption circuit as a certificate, thereby forming the encrypted certificate.

28. An authority according to claim 25, wherein said certificate authority comprises a communication unit for receiving communication data which is transmitted from said service providing apparatus and which contains the collation result encrypted by said user terminal, and transmitting an encrypted certificate to said service providing apparatus, a terminal database for retrieving second seed information corresponding to first seed information for use in generation of a first password in said user terminal, by using that terminal identification information of said service providing apparatus which is contained in the communication data received by said communication unit, a password generation circuit for generating a second password by using the second seed information retrieved by said terminal database, a collating circuit for collating the second password with a first password contained in the communication data, thereby checking the validity of the first password corresponding to the collation result from said user terminal, an apparatus database for retrieving a second encryption key corresponding to a second decryption key for use in said service providing apparatus by using the apparatus identification information as a key, and an encryption circuit for encrypting, by using the second encryption key retrieved by said apparatus database, a certificate containing the collation result obtained by said collating circuit, thereby forming the encrypted certificate, and outputting the encrypted certificate to said communication unit.

29. A user terminal for use in a network authentication system in which authentication is to be performed using biometrical information of a user himself or herself between said user terminal and a service providing apparatus connected by a communication network, the authentication is performed on the basis of that certification of the validity of a collation result from said user terminal, which is performed by a certificate authority connected via the communication network, wherein said user terminal identifies the user by collation by using the biometrical information of the user, notifies the collation result to said service providing apparatus via the communication network, thereby allowing said service providing apparatus to request, in response to this notification of the collation result from said user terminal, said certificate authority across the communication network to certify the validity of the collation result, receives a certificate which is notified from said certificate authority in response to the request and which certifies the validity of the collation result, and allows said service providing apparatus to provide a predetermined service to the user on the basis of the collation result contained in the certificate.

30. A network authentication method in which when authentication is to be performed by using biometrical information of a user himself or herself between a user terminal and a service providing apparatus connected by a communication network, the authentication is performed on the basis of that certification of the validity of a collation result from the user terminal, which is performed by a certificate authority connected via the communication network, wherein in response to notification of the result of user collation performed using the biometrical information of the user in the user terminal, the service providing apparatus requests the certificate authority via the communication network to certify the validity of the collation result and, if the validity of the collation result is certified by a certificate notified from the certificate authority, provides a predetermined service to the user on the basis of the collation result contained in the certificate.

31. A network authentication method in which when authentication is to be performed using biometrical information of a user himself or herself between a user terminal and a service providing apparatus connected by a communication network, the authentication is performed on the basis of that certification of the validity of a collation result from the user terminal, which is performed by a certificate authority connected via the communication network, wherein when, in response to notification of the result of user collation performed using the biometrical information of the user in the user terminal, requested to certify the validity of the collation result by the service providing apparatus via the communication network, the certificate authority certifies the validity of the collation result and notifies a certificate containing the collation result across the communication network, thereby allowing the service providing apparatus to provide a predetermined service to the user on the basis of the collation result contained in the certificate.

32. A network authentication method in which authentication is to be performed using biometrical information of a user himself or herself between a user terminal and a service providing apparatus connected by a communication network, the authentication is performed on the basis of that certification of the validity of a collation result in the user terminal, which is performed by a certificate authority connected via the communication network, wherein the user terminal identifies the user by collation by using the biometrical information of the user, notifies the collation result to the service providing apparatus via the communication network, thereby allowing the service providing apparatus to request, in response to this notification of the collation result from the user terminal, the certificate authority via the communication network to certify the validity of the collation result, receives a certificate which is notified from the certificate authority in response to the request and which certifies the validity of the collation result, and allows the service providing apparatus to provide a predetermined service to the user on the basis of the collation result contained in the certificate.

33. A certificate authority for use in a network authentication system in which when authentication of a user is to be performed between a user terminal and a service providing apparatus connected by a communication network, said certificate authority connected via the communication network authenticates the validity of a collation result from said user terminal, wherein when, in response to notification of the result of user collation performed using the biometrical information of the user in said user terminal, requested to certify the validity of the collation result by said service providing apparatus across the communication network, said certificate authority certifies the validity of the collation result and notifies a certificate containing the collation result via the communication network, thereby allowing said service providing apparatus to provide a predetermined service to the user on the basis of the collation result contained in the certificate.

34. A service providing apparatus for use in a network authentication system in which when authentication of a user is to be performed between a user terminal and said service providing apparatus connected by a communication network, a certificate authority connected via the communication network authenticates the validity of a collation result from said user terminal, wherein in response to the result of user collation performed using the biometrical information of the user in said user terminal, said service providing apparatus requests said certificate authority via the communication network to certify the validity of the collation result, and provides a predetermined service to the user on the basis of the collation result contained in a certificate notified from said certificate authority in response to the request.

\* \* \* \* \*